US012730933B2

(12) United States Patent
McLachlan et al.

(10) Patent No.: US 12,730,933 B2
(45) Date of Patent: Sep. 8, 2026

(54) TECHNIQUES FOR TIME-CONTROLLED USER DATA PRIVACY

(71) Applicant: TELEFONAKTIEBOLAGET LM ERICSSON (PUBL), Stockholm (SE)

(72) Inventors: Paul McLachlan, San Francisco, CA (US); Héctor Caltenco, Oxie (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 171 days.

(21) Appl. No.: 18/255,361

(22) PCT Filed: Dec. 8, 2020

(86) PCT No.: PCT/IB2020/061647
§ 371 (c)(1),
(2) Date: May 31, 2023

(87) PCT Pub. No.: WO2022/123290
PCT Pub. Date: Jun. 16, 2022

(65) Prior Publication Data
US 2024/0028766 A1 Jan. 25, 2024

(51) Int. Cl.
*G06F 21/62* (2013.01)
*H04L 9/40* (2022.01)

(52) U.S. Cl.
CPC ........ *G06F 21/6254* (2013.01); *H04L 63/105* (2013.01); *G06F 2221/2143* (2013.01)

(58) Field of Classification Search
CPC ..... G06F 21/62–629; G06F 2221/2143; H04L 63/10–108
See application file for complete search history.

(56) References Cited

U.S. PATENT DOCUMENTS 7,302,419 B2 * 11/2007 Conkwright .......... G06Q 30/02 705/14.69
9,672,364 B2 6/2017 Zhang et al.
9,916,472 B2 3/2018 Heckel et al.
10,192,069 B2 1/2019 Nerurkar et al.
(Continued)

FOREIGN PATENT DOCUMENTS

CN 102571949 A * 7/2012
WO WO-2015125126 A2 * 8/2015 ......... G06Q 20/0655
WO 2021105749 A1 6/2021

*Primary Examiner* — Madhuri R Herzog

(57) ABSTRACT

The present disclosure relates to techniques for providing and facilitating time-controlled data for preserving privacy of data sources. Embodiments are provided herein for methods, processes, devices, network nodes, computer program products, and computer-readable media. In some embodiments, a network node receives first data for a first data transaction that is assigned a unique identifier. In response, the network node enables transmission of second data and the unique identifier to one or more entity. In accordance with a determination that an indication of the time limit indicates a non-zero time limit for retention of the first data for the first data transaction, the node enables storage of one or more of the first data and the second data according to the time limit. In accordance with a determination that the indication does not indicate a non-zero time limit, the node causes deletion of the first data and the second data.

26 Claims, 17 Drawing Sheets

(56) References Cited

U.S. PATENT DOCUMENTS

| | | | | |
|---|---|---|---|---|
| 10,366,249 | B2 | 7/2019 | Chen et al. | |
| 10,484,234 | B1 * | 11/2019 | Sun | H04L 41/0631 |
| 10,489,605 | B2 | 11/2019 | Nerurkar et al. | |
| 12,333,572 | B2 | 6/2025 | Mclachlan et al. | |
| 2009/0036157 | A1 | 2/2009 | Mackie | |
| 2010/0185750 | A1 * | 7/2010 | Nakayama | H04N 1/00464 709/219 |
| 2016/0239868 | A1 * | 8/2016 | Demsey | G06Q 30/0264 |
| 2017/0308582 | A1 | 10/2017 | Drost-Hansen et al. | |
| 2017/0357820 | A1 | 12/2017 | Sierra et al. | |
| 2018/0349636 | A1 | 12/2018 | Bhowmick et al. | |
| 2018/0349638 | A1 | 12/2018 | Barraclough et al. | |
| 2018/0349946 | A1 | 12/2018 | Nguyen et al. | |
| 2019/0065775 | A1 | 2/2019 | Klucar, Jr. et al. | |
| 2019/0266256 | A1 | 8/2019 | Dudani et al. | |
| 2020/0019994 | A1 | 1/2020 | Hartzell et al. | |
| 2021/0026803 | A1 * | 1/2021 | Dudani | G06Q 10/10 |
| 2021/0243150 | A1 * | 8/2021 | Vasamsetti | G06F 16/125 |
| 2022/0343023 | A1 * | 10/2022 | Kirschbaum | G06F 21/6263 |

* cited by examiner

TECHNIQUES FOR TIME-CONTROLLED USER DATA PRIVACY

PRIORITY CLAIM

This application is a national stage of International Application No. PCT/IB2020/061647, filed Dec. 8, 2020, the entire disclosure of which is fully incorporated by reference herein for all purposes.

TECHNICAL FIELD

This application relates to collection and processing of data over a network, and in particular to providing time-controlled data for preserving privacy of data sources.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise.

The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Individual-level data is a cornerstone of the global economy. Companies use these data to generate insights that inform business decisions and for predictions that improve business processes. Many aspects of the global economy, as they are currently designed, could not operate without access to individual-level data on behavior, psychographics, location, or purchases. For instance, telecom operators such as Ericsson use individual-level location and behavioral data to optimize network design and rollout by deciding where to place cell phone towers and what profile to assign to them. Similarly, digital advertisers use individual-level data to assign users to audiences, which then determine what advertisements users see. In a final example, traffic planners use individual-level data both to understand origin-destination matrices for traffic planning as well as to bill vehicles for tolls or congestion fees.

Regardless of vertical or use case, these industries share a common data architecture; they rely upon access to repositories of historical data. Constituting a non-trivial proportion of the data economy, companies such as Epsilon, Acxiom, and KBM operate these repositories. They obtain their underlying data from multiple sources, including directly from companies' customer relationship management (CRM) software. Companies then enrich their first-party data with second- and third-party data purchased from aggregators in order to improve the performance of their statistical and/or AI models.

Analysts expect 5G New Radio (NR) will change the data ecosystem in several fundamental ways. First, it will lead to a proliferation of new sensors and IoT devices. In contrast to the historical nature of data retained by aggregators, these sensors will produce extremely rich data in real-time. Second, consumers will increasingly rely upon 5G NR to connect their in-home devices and wearable sensors, centralizing data flows within mobile network operators (MNOs). This is unlike today, where existing devices and sensors connect over Bluetooth, 4G/LTE, and/or WiFi, scattering data flows.

These changes have profound implications for end user data privacy and management. If consumers today are uneasy about their data being stored in persistent databases, it follows that they will refuse to share data from these new sources if commercial use requires permanent storage. Policy and lawmakers are imposing new legal requirements on the data ecosystem, such as California's California Consumer Privacy Act (CCPA), Canada's Personal Information and Protection and Electronic Documents Act (PIPEDA), and the European Union's General Data Protection Regulations (GDPR). In addition to imposing limits on data aggregators, these new legal regimes impose severe fines for mishandling individual-level data. This suggests a need for architectural solutions to data privacy and management.

In addition to the lack of suitable architecture, latency and speed have historically been impediments to working with real-time data. For example, per standards set by the Interactive Advertising Bureau, the maximum time allowed for the entire digital advertising process to complete is 200 milliseconds. In many cases, this is too short a time for 4G/LTE or earlier generations of mobile technology to upload data in real-time and receive a response. 5G NR and WiFi, however, have sufficiently high speed and low latency to allow data to be uploaded and processed in real time.

SUMMARY

Improvements in latency and speed can be a key component in any architecture related to data privacy. For example, Applicant's previous work (PCT Application No. PCT/IB2019/060191) relates to techniques in which end users control which data are uploaded via 5G NR/WiFi to an edge and/or cloud (hereinafter, edgecloud) computing facility in which the data are processed. A one-time use ID (e.g., 1AdID) associates a data array with any user equipment (UE). As soon as a prediction and/or inference is returned, the underlying data array is deleted. As 1AdIDs are temporally defined, companies can only send data back to a UE as long as the 1AdID remains valid. This creates an architecture where no user data is retained for longer than a few seconds.

There currently exist certain challenges. While the architecture described in earlier inventions allows for full end user privacy, the near-instantaneous deletion of all user data severely restricts data's utility and creates issues from a user experience perspective. Consider digital advertising. Advertisers may benefit from using real-time data to send users highly personalized and relevant coupons (e.g., due to lower costs achieved by avoiding data storage associated with large data lakes). Once the 1AdID is deleted, however, it becomes impossible for retailers to measure the effectiveness of campaigns or retarget customers; there is simply no data linking advertisement to consumer behavior. In a similar example, eliminating traffic managers' access to persistent data would mean that a road tolling authority could not determine whether a vehicle had already paid for congestion pricing. These challenges will slow adoption and hinder the utility of AI-based systems.

While prior work on this topic focuses on consent management, it does not specifically incorporate network architecture elements such as mobile networks, edgecloud computing, or allow preferences to be set via UEs and transmitted over networks. Moreover, prior work does not allow the integration of data from nearby sensors, IoT devices, or wearables.

The problem with current solutions is twofold. The majority of solutions related to differential privacy develop statistical techniques to maintain underlying data distributions while destroying original data (See, e.g., US Patent No. US20190065775A1. "Calculating differentially private queries using local sensitivity on time variant databases."; U.S. patent Ser. No. 10/489,605B2. "Differentially private density plots."; U.S. patent Ser. No. 10/192,069B2. "Differentially private processing and database storage."; U.S. patent Ser. No. 10/366,249B2. "System and method for privacy management of infinite data streams."; U.S. Pat. No. 9,916,472B2. "Obfuscation and protection of data rights."; US20180349636A1. "Differential privacy using a count mean sketch."; US Patent No. US20180349638A1. "User experience using privatized crowdsourced data."; U.S. Pat. No. 9,672,364B2. "Differentially private linear queries on histograms."; US20170357820A1. "Efficient Implementation for differential privacy using cryptographic functions."). Applicant's previous work can allow for full privacy preservation but without allowing data being retained for longer than a few milliseconds. This makes inferences across greater time scales impossible.

For example, the following features are missing in existing solutions:

- The ability for end users to set a global preference for how long data remain available in a graphical user interface (GUI).
- The ability for end users to vary the length of time data remain available for different entities (e.g., companies) in a GUI.
- The ability for end users to vary the length of time data remain available for different purposes within an entity in a GUI.
- The ability for end users to select that some data be discarded instantaneously, while other pieces of raw data transferred into a database to be used for other purposes.
- The assignment of multiple identifiers to the same transmission (e.g. 1AdID, QuickID, LongID) for purposes of identification.
- The capability of companies requesting access to user data from a centralized database via a LongID or another arbitrary identifier.
- The ability to delete the underlying data stored in a centralized database and send a receipt confirming the deletion of those data per retention rules set by the end user.

Therefore, there is a desire for techniques that permit obtaining and processing of data from user devices in a time-controlled and privacy-preserving manner. There are, proposed herein, various embodiments which address one or more of the issues disclosed herein. For example, proposed herein is an architecture that allows data to be processed at the edge or in the cloud and then deleted after a configured time limit.

In some embodiments, a method is performed by a network node, the method comprising: receiving, from a device associated with a user profile, first data for a first data transaction that is assigned a unique identifier that uniquely identifies the first data transaction. The method further comprising in response to receiving the first data from the device, enabling transmission of second data and the unique identifier to one or more data receiving entity, wherein the second data is associated with an indication of a time limit for retention of the first data for the first data transaction, and wherein the second data is at least one of an instance of the first data, data that includes the first data, and data generated using the first data. The method further comprising: in accordance with a determination that the indication of the time limit indicates a non-zero time limit for retention of the first data for the first data transaction, enabling storage of one or more of the first data and the second data according to the time limit; and in accordance with a determination that the indication of the time limit does not indicate a non-zero time limit for retention of the first data for the first data transaction, causing deletion of the first data and the second data.

In some embodiments, a network node comprises one or more processor and memory including instructions executable by said one or more processor for causing the network node to: receive, from a device associated with a user profile, first data for a first data transaction that is assigned a unique identifier that uniquely identifies the first data transaction. The memory further including instructions executable by said one or more processor for causing the network node to, in response to receiving the first data from the device, enable transmission of second data and the unique identifier to one or more data receiving entity, wherein the second data is associated with an indication of a time limit for retention of the first data for the first data transaction, and wherein the second data is at least one of an instance of the first data, data that includes the first data, and data generated using the first data. The memory further including instructions executable by said one or more processor for causing the network node to, in accordance with a determination that the indication of the time limit indicates a non-zero time limit for retention of the first data for the first data transaction, enable storage of one or more of the first data and the second data according to the time limit; and in accordance with a determination that the indication of the time limit does not indicate a non-zero time limit for retention of the first data for the first data transaction, cause deletion of the first data and the second data.

In some embodiments, a non-transitory computer readable medium comprising instructions executable by one or more processor of a network node, said instructions including instructions for: receiving, from a device associated with a user profile, first data for a first data transaction that is assigned a unique identifier that uniquely identifies the first data transaction. The instructions further including instructions for, in response to receiving the first data from the device, enabling transmission of second data and the unique identifier to one or more data receiving entity, wherein the second data is associated with an indication of a time limit for retention of the first data for the first data transaction, and wherein the second data is at least one of an instance of the first data, data that includes the first data, and data generated using the first data. The instructions further including instructions for, in accordance with a determination that the indication of the time limit indicates a non-zero time limit for retention of the first data for the first data transaction, enabling storage of one or more of the first data and the second data according to the time limit; and in accordance with a determination that the indication of the time limit does not indicate a non-zero time limit for retention of the first data for the first data transaction, causing deletion of the first data and the second data.

In some embodiments, a transitory computer readable medium comprising instructions executable by one or more processor of a network node, said instructions including instructions for: receiving, from a device associated with a user profile, first data for a first data transaction that is assigned a unique identifier that uniquely identifies the first data transaction. The instructions further including instructions for, in response to receiving the first data from the device, enabling transmission of second data and the unique identifier to one or more data receiving entity, wherein the second data is associated with an indication of a time limit for retention of the first data for the first data transaction, and wherein the second data is at least one of an instance of the first data, data that includes the first data, and data generated using the first data. The instructions further including instructions for, in accordance with a determination that the indication of the time limit indicates a non-zero time limit for retention of the first data for the first data transaction, enabling storage of one or more of the first data and the second data according to the time limit; and in accordance with a determination that the indication of the time limit does not indicate a non-zero time limit for retention of the first data for the first data transaction, causing deletion of the first data and the second data.

In some embodiments, a computer program comprises program code to be executed by one or more processer of a network node, whereby execution of the program code causes the network node to perform operations, the operations comprising: receiving, from a device associated with a user profile, first data for a first data transaction that is assigned a unique identifier that uniquely identifies the first data transaction. The operations further comprising, in response to receiving the first data from the device, enabling transmission of second data and the unique identifier to one or more data receiving entity, wherein the second data is associated with an indication of a time limit for retention of the first data for the first data transaction, and wherein the second data is at least one of an instance of the first data, data that includes the first data, and data generated using the first data. The operations further comprising, in accordance with a determination that the indication of the time limit indicates a non-zero time limit for retention of the first data for the first data transaction, enabling storage of one or more of the first data and the second data according to the time limit; and in accordance with a determination that the indication of the time limit does not indicate a non-zero time limit for retention of the first data for the first data transaction, causing deletion of the first data and the second data.

In some embodiments, a method is performed by an electronic device, the method comprising: presenting one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits. The method further comprising receiving user input, associated with the one or more options, that specifies a first data retention time limit for a first class of data. The method further comprising causing the first data retention time limit to be associated with the user profile that is associated with the electronic device. The method further comprising, while the first data retention time limit is associated with the user profile, transmitting one or more sets of data that qualify as the first class of data for storage at the remote user data collection system for no longer than the first data retention time limit, wherein the one or more sets of data that qualify as the first class of data are associated with one or more data transactions each identified by a respective unique identifier.

In some embodiments, an electronic device comprises one or more processor and memory including instructions executable by said one or more processor for causing the electronic device to: present one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits. The memory including instructions executable by said one or more processor for causing the electronic device to receive user input, associated with the one or more options, that specifies a first data retention time limit for a first class of data. The memory including instructions executable by said one or more processor for causing the electronic device to cause the first data retention time limit to be associated with the user profile that is associated with the electronic device. The memory including instructions executable by said one or more processor for causing the electronic device to, while the first data retention time limit is associated with the user profile, transmit one or more sets of data that qualify as the first class of data for storage at the remote user data collection system for no longer than the first data retention time limit, wherein the one or more sets of data that qualify as the first class of data are associated with one or more data transactions each identified by a respective unique identifier.

In some embodiments, a non-transitory computer readable medium comprises instructions executable by one or more processor of an electronic device, said instructions including instructions for: presenting one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits. The instructions further including instructions for receiving user input, associated with the one or more options, that specifies a first data retention time limit for a first class of data. The instructions further including instructions for causing the first data retention time limit to be associated with the user profile that is associated with the electronic device. The instructions further including instructions for, while the first data retention time limit is associated with the user profile, transmitting one or more sets of data that qualify as the first class of data for storage at the remote user data collection system for no longer than the first data retention time limit, wherein the one or more sets of data that qualify as the first class of data are associated with one or more data transactions each identified by a respective unique identifier.

In some embodiments, a transitory computer readable medium comprises instructions executable by one or more processor of an electronic device, said instructions including instructions for: presenting one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits. The instructions further including instructions for receiving user input, associated with the one or more options, that specifies a first data retention time limit for a first class of data. The instructions further including instructions for causing the first data retention time limit to be associated with the user profile that is associated with the electronic device. The instructions further including instructions for, while the first data retention time limit is associated with the user profile, transmitting one or more sets of data that qualify as the first class of data for storage at the remote user data collection system for no longer than the first data retention time limit, wherein the one or more sets of data that qualify as the first class of data are associated with one or more data transactions each identified by a respective unique identifier.

In some embodiments, a computer program comprises program code to be executed by one or more processer of an electronic device, whereby execution of the program code causes the electronic device to perform operations, the operations comprising: presenting one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits. The operations further comprising receiving user input, associated with the one or more options, that specifies a first data retention time limit for a first class of data. The operations further comprising causing the first data retention time limit to be associated with the user profile that is associated with the electronic device. The operations further comprising, while the first data retention time limit is associated with the user profile, transmitting one or more sets of data that qualify as the first class of data for storage at the remote user data collection system for no longer than the first data retention time limit, wherein the one or more sets of data that qualify as the first class of data are associated with one or more data transactions each identified by a respective unique identifier.

In some embodiments, a method is performed by a network node, the method comprising: receiving first data for a first data transaction that is associated with a user profile, wherein the first data includes: a first unique identifier that uniquely identifies the first data transaction involving a device associated with the user profile; an identifier of an external requesting entity, other than the user profile, that is permitted access to the first data; an indication of a first time limit for retention of the first data for the first transaction; and first personal data, provided by a device associated with the user profile. The method further comprising storing the first data for access by the external requesting entity. The method further comprising providing, to the external requesting entity other than the user profile, the first unique identifier and the first personal data. The method further comprising, upon the expiration of the first time limit for retention of the first data for the first transaction, deleting at least a portion of the first data that includes the first unique identifier.

In some embodiments, a network node comprises one or more processor and memory including instructions executable by said one or more processor for causing the network node to: receive first data for a first data transaction that is associated with a user profile, wherein the first data includes: a first unique identifier that uniquely identifies the first data transaction involving a device associated with the user profile; an identifier of an external requesting entity, other than the user profile, that is permitted access to the first data; an indication of a first time limit for retention of the first data for the first transaction; and first personal data, provided by a device associated with the user profile. The memory further including instructions executable by said one or more processor for causing the network node to store the first data for access by the external requesting entity. The memory further including instructions executable by said one or more processor for causing the network node to provide, to the external requesting entity other than the user profile, the first unique identifier and the first personal data. The memory further including instructions executable by said one or more processor for causing the network node to, upon the expiration of the first time limit for retention of the first data for the first transaction, delete at least a portion of the first data that includes the first unique identifier.

In some embodiments, a non-transitory computer readable medium comprises instructions executable by one or more processor of a network node, said instructions including instructions for: receiving first data for a first data transaction that is associated with a user profile, wherein the first data includes: a first unique identifier that uniquely identifies the first data transaction involving a device associated with the user profile; an identifier of an external requesting entity, other than the user profile, that is permitted access to the first data; an indication of a first time limit for retention of the first data for the first transaction; and first personal data, provided by a device associated with the user profile. The instructions further including instructions for storing the first data for access by the external requesting entity. The instructions further including instructions for providing, to the external requesting entity other than the user profile, the first unique identifier and the first personal data. The instructions further including instructions for, upon the expiration of the first time limit for retention of the first data for the first transaction, deleting at least a portion of the first data that includes the first unique identifier.

In some embodiments, a transitory computer readable medium comprises instructions executable by one or more processor of a network node, said instructions including instructions for: receiving first data for a first data transaction that is associated with a user profile, wherein the first data includes: a first unique identifier that uniquely identifies the first data transaction involving a device associated with the user profile; an identifier of an external requesting entity, other than the user profile, that is permitted access to the first data; an indication of a first time limit for retention of the first data for the first transaction; and first personal data, provided by a device associated with the user profile. The instructions further including instructions for storing the first data for access by the external requesting entity. The instructions further including instructions for providing, to the external requesting entity other than the user profile, the first unique identifier and the first personal data. The instructions further including instructions for, upon the expiration of the first time limit for retention of the first data for the first transaction, deleting at least a portion of the first data that includes the first unique identifier.

In some embodiments, a computer program comprises program code to be executed by one or more processer of a network node, whereby execution of the program code causes the network node to perform operations, the operations comprising: receiving first data for a first data transaction that is associated with a user profile, wherein the first data includes: a first unique identifier that uniquely identifies the first data transaction involving a device associated with the user profile; an identifier of an external requesting entity, other than the user profile, that is permitted access to the first data; an indication of a first time limit for retention of the first data for the first transaction; and first personal data, provided by a device associated with the user profile. The operations further comprising storing the first data for access by the external requesting entity. The operations further comprising providing, to the external requesting entity other than the user profile, the first unique identifier and the first personal data. The operations further comprising, upon the expiration of the first time limit for retention of the first data for the first transaction, deleting at least a portion of the first data that includes the first unique identifier.

Certain aspects of the present disclosure and their embodiments may provide solutions to these or other challenges. In the present disclosure, Applicant proposes a new architecture that uses the low latency and high-speed networks (such as 5G NR and/or WiFi) to protect the privacy of individual-level data. Low latency and high speed are important due to the common need to inference using real-time data paired with historical data in near real-time. Unlike existing techniques, the architecture described herein does not require the immediate deletion of all individual-level data. Instead, the techniques described herein that utilize Applicant's proposed architecture allow end users to share predictions, inferences, and even raw data with commercial requestors and manage the length of time these fields can be matched to their UE. In some embodiments, to do so, whenever a UE uploads an array of data into an edgecloud environment, a node or system of the architecture assigns it one or more of three unique identifiers: a 1AdID, a QuickID, and a LongID. In some embodiments, 1AdIDs are used to uniquely identify the UE. In some embodiments, QuickIDs allow insights and/or predictions to be shared immediately, as per digital advertising. In some embodiments, LongIDs allow end users to store results and predictions in a databased maintained by MNOs or other databanks. For example, entities (e.g., companies) can then request access to end users' data via their LongID. Crucially, end users can be the ones who specify the duration for which each LongID is valid, meaning they can revoke companies' access to their data at any point—or automatically. This can allow end users full control over their data, while granting companies access to data for longer than a few milliseconds.

Another difference between the techniques described herein and existing techniques is that the architecture described herein can incorporate (e.g., include or be connected to) a second database (e.g., for a third party) where users can store insights, predictions, or raw data. Such a database is innovative in that incorporates some of the ongoing computer science and statistical research on differential privacy into data and network architecture.

The techniques described herein propose a new architecture that incorporates the latest in differential privacy to allow for end users to fully control their individual-level data while making it possible for companies to access predictions, inferences, or raw data for more than a few milliseconds. This later observation is one key point of departure from Applicant's earlier work in this field, which does not allow any data to be preserved for longer than is strictly necessary. While such strict measures can ensure full privacy, there are numerous use cases where companies need access to individual-level data for more time.

In this new architecture, Applicant's techniques benefit from the predicted connectivity centralization from 5G NR and WiFi. Unlike earlier generations of mobile networks, where sensors, wearables, and IoT devices connected over a variety of media, Applicant predicts these devices will primarily connect to the network over 5G NR in the near future. In some embodiments, an initial step in a technique utilizing the proposed architecture is that user data is merged into an array on the UE and uploaded to an edgecloud (e.g., a server or processing environment at or near the network edge) environment and identified by its 1AdID. In some embodiments, as an alternative initial step or complementary initial step, relevant data from sensors, wearables, and IoT devices within some distance (e.g., arbitrary, predefined, or the like) away from the UE can be included in the array (the Detailed Description below provides more detail on the physical distance). In some embodiments, as an alternative initial step or complementary initial step, relevant data from sensors, wearables, and IoT devices are uploaded directly (e.g., not via the UE) into the edgecloud and associated with UE data using the 1AdID.

One or more embodiments of the architecture and techniques described herein can include or enable one or more of the following features:

- The ability for end users to set a global preference for how long data remain available in a graphical user interface (GUI).
- The ability for end users to vary the length of time data remain available for different companies in a GUI.
- The ability for end users to vary the length of time data remain available for different purposes within a company in a GUI.
- The ability for end users to select that some data be discarded instantaneously, while other pieces of raw data transferred into a database to be used for other purposes.
- The assignment of multiple identifiers to the same transmission (e.g. 1AdID, QuickID, LongID) for purposes of identification.
- The capability of companies requesting access to user data from a centralized database via a LongID or another arbitrary identifier.
- The ability to delete the underlying data stored in a centralized database and send a receipt confirming the deletion of those data per retention rules set by the end user.

Certain embodiments may provide one or more of the following technical advantages. In particular, the embodiments disclosed herein can include one or more advantages over earlier generations of privacy-preservation solutions. For example, in contrast to earlier research and inventions that focus on preserving privacy by varying underlying data, certain embodiments disclosed herein can remove that step while maintaining privacy. Removing this step can decrease computational time and prevents algorithms from causing statistical errors. As another example, certain embodiments described herein can allow commercial end users to access predictions and inferences for longer than a few seconds. This can reduce unnecessary repeat computation of such predictions and inferences and increase their utility, which can help drive the commercialization of privacy-preserving architecture.

Certain embodiments described herein provide anew architecture to process end user data with privacy due to one or more of the following:

- Processing user data at the edge or in the cloud
- Allowing end users to assign different retention rules to data
- Storing data with longer retention rules in a database
- Assigning data stored in a database a unique identifier that does not allow reidentification of the originating UE
- Deleting data from a database according to retention rules set by end users
- Sending receipts confirming deletion from either the edgecloud or database Certain embodiments described herein related to the proposed architecture can provide the following advantages:

- Speed: using 5G, edge computing, and cloud computing will allow inferencing and prediction process via machine learning, statistics, and AI to complete far faster than current solutions
- Scalability: The architecture is scalable since it is cloud- and edge-ready.
- Flexibility: The architecture is flexible since all inferencing can be done on the end user's device, at the edge, or in the cloud.
- Privacy: by allowing true differential privacy, this solution is far more private that earlier solutions.
- Context: By including real-time data and making it available for longer periods of time, the resulting inferences should be far superior.

Additional details are provided below.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

1. User Control of Data Privacy

In accordance with some embodiments, the ability for end users to set a global preference for how long data remains available is a feature of the proposed architecture. This process could be done in multiple ways, for example via user interfaces that can receive direct input of user preferences or by AI systems that can predict and learn from users' actions and behaviors. In the present disclosure, Applicant presents an example of a hypothetical graphical user interface to handle those preferences.

Figure 1:
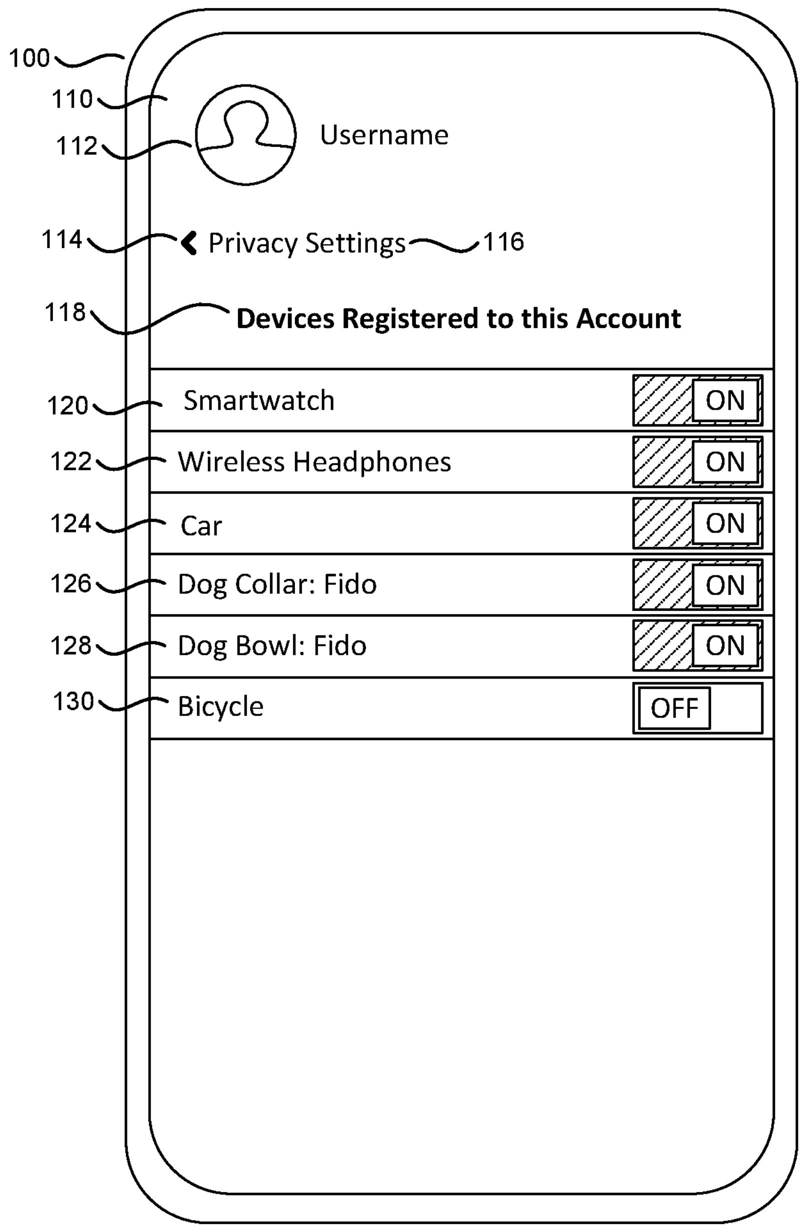
FIG. 1 illustrates an exemplary user interface in accordance with some embodiments.

FIG. 1 illustrates an exemplary privacy settings user interface screen where the user can select which devices can send data to be uploaded into the edgecloud for inference. In particular, FIG. 1 depicts a mockup of an exemplary user interface 110 on an exemplary UE 100 (a smartphone with a touch-sensitive display surface) wherein the end user selects which data is included in their initial data array to be uploaded into the edgecloud. Exemplary user interface 110 includes a user identifier 112 (associated with or otherwise representing a user account), previous screen icon 114, previous screen title 116 ("Privacy Settings"), current screen title 118 ("Devices Registered to this Account"), and device selectors 120, 122, 124, 126, 128, and 130. Each of the device selectors in FIG. 1 include a selectable toggle icon (e.g., shown as either toggled "ON" or "OFF"), for selecting which devices can send data to the edgecloud for inference (e.g., by tapping the toggle icon). Other arrangements and presentations of user interface 110 for selecting devices are possible, and are intended to be within the scope of the present disclosure.

In this example, in addition to selecting the types of device data included in one or more arrays uploaded to the edgecloud as in FIG. 1, end users can also be presented the option of selecting the duration for which that data is available. In some embodiments, a user sets a default duration (e.g., a global default duration). In some embodiments, a user sets one or more individual duration lengths to different commercial requestors (e.g., each commercial requester has one or more associated configured duration). An example of such a selection is shown in FIGS. 2 and 3.

Figure 2:
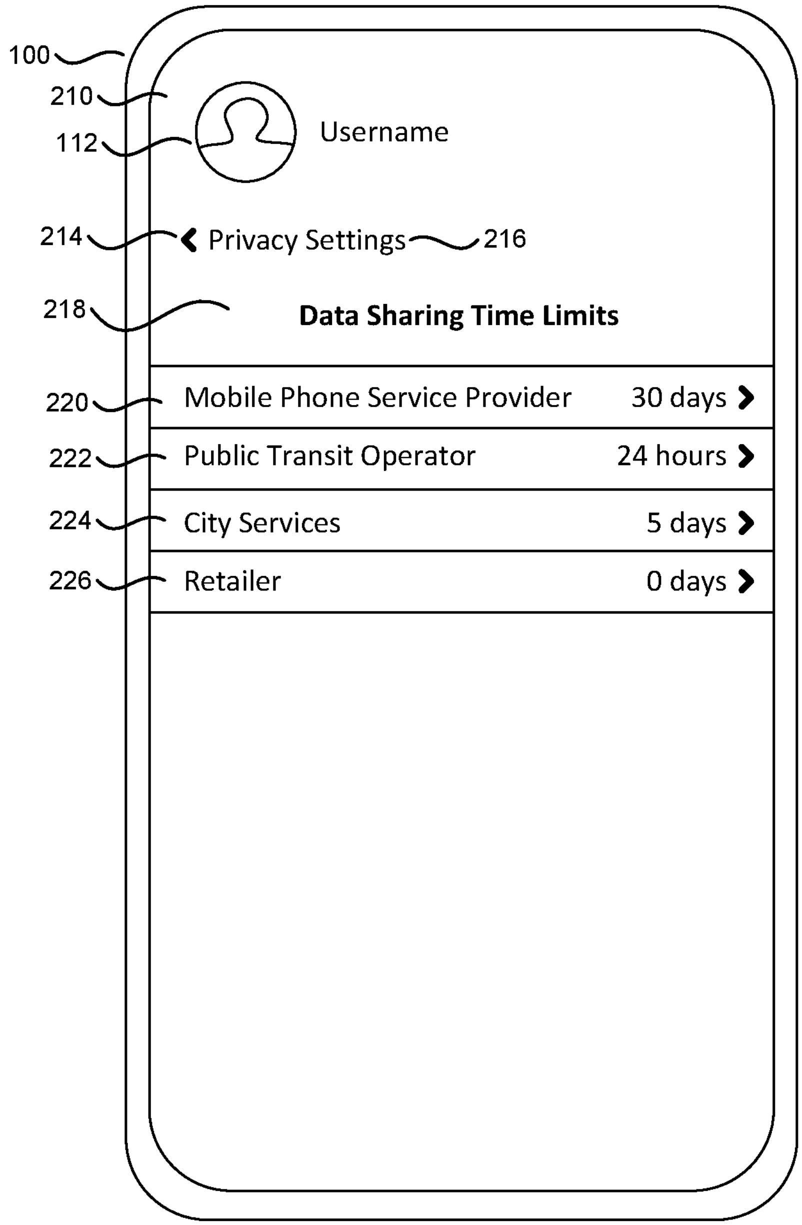
FIG. 2 illustrates an exemplary user interface in accordance with some embodiments.

FIG. 2 illustrates an exemplary user interface 210 on a UE for facilitating data sharing time limits. Using user interface 210, an end user can select how long a specific data field uploaded into the edgecloud is preserved for different entities (e.g., commercial requestors, companies, third-party users). In this example, the end user selects how long the entities named "Mobile Phone Service Provider", "Public Transit Operator", "City Services", and "Retailer" have access to the data field. Exemplary user interface 210 includes user identifier 112, previous screen icon 214, previous screen title 216 ("Privacy Settings"), current screen title 218 ("Data Sharing Time Limits"), and entity selectors 220, 222, 224, and 226 (each corresponding to a respective entity Mobile Phone Service Provider, Public Transit Operator, City Services, and Retailer). In the example in FIG. 2, UE 100 can receive selection of an entity selector and, in response, present the user with an interface for selecting a time limit (similar to as shown in FIG. 3) (e.g., displayed with or overlaid on the current user interface, or at a new user interface screen).

In some use cases, end users may prefer to customize the duration for which data remain available for different use cases. These options, which are later recorded in the LongID assigned to each array, can be set according to the exemplary user interface in FIG. 3.

Figure 3:
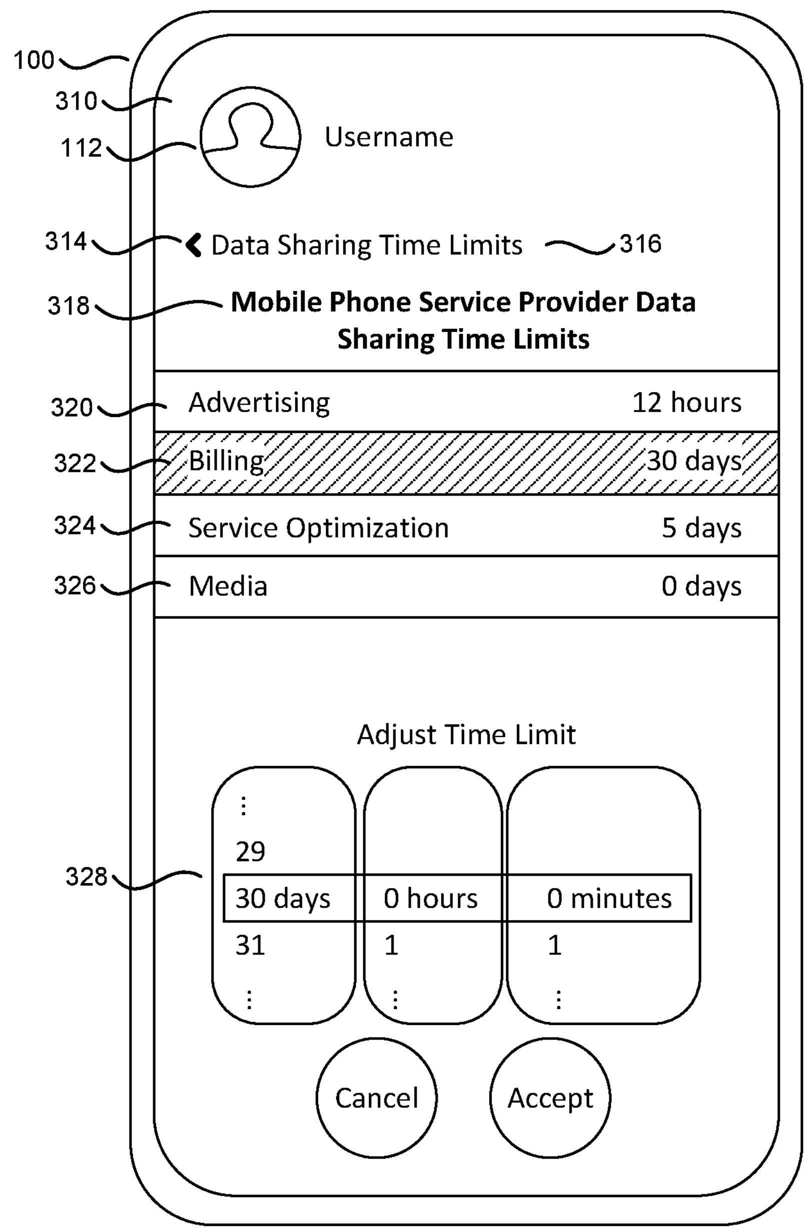
FIG. 3 illustrates an exemplary user interface in accordance with some embodiments.

FIG. 3 illustrates an exemplary user interface 310 on a UE for facilitating data sharing time limits. Using user interface 310, an end user can select how long data uploaded into the edgecloud is preserved for different use cases within the same entity (e.g., commercial requestor). In this case, the end user has granted the entity named "Mobile Phone Service Provider" with access to advertising data for 12 hours (indicated by selector 320), but to billing data for 30 days (indicated by selector 322). Additionally, then entity has been granted access to service optimization data for 5 days (indicated by selector 324), and media data for 0 days (e.g., immediate deletion) (indicated by selector 326). Exemplary user interface 310 includes user identifier 112, previous screen icon 314, previous screen title 316 ("Data Sharing Time Limits"), current screen title 318 ("Mobile Phone Service Provider Data Sharing Time Limits"), and time limit selector 328. In this example, time limit selector 328 can be used to adjust the time limit by vertically scrolling values in respective boxes for increments of days, hours, and/or minutes and accepting the selected time limit using the appropriate icon (labeled "Accept" in this example). Any other appropriate time selection interfaces or entry fields can be used.

Applicant notes that the exemplary interfaces illustrated in FIGS. 1, 2, and 3 are merely provided as examples, and that the interfaces can include less than the elements shown, additional elements not shown, or differ and arrangement and still provide the functionality intended to be within the scope of this disclosure. Any such departures from the illustrated examples that does so is intended to within the scope of this disclosure.

2. Assigning QuickID and LongID

Figure 4:
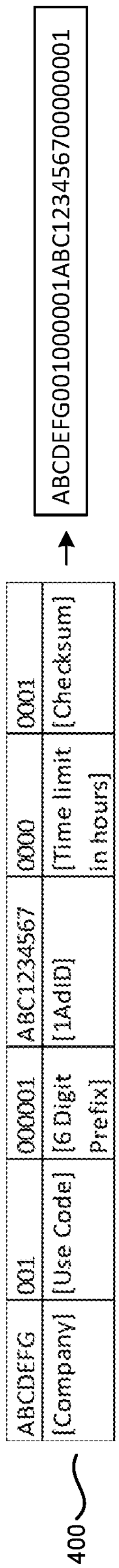
FIG. 4 illustrates an exemplary unique identifier in accordance with some embodiments.

Continuing with the example above, once in the edgecloud environment, the next step is that the array is assigned two additional identifiers: a QuickID and a LongID. QuickIDs are one-time use and can be configured to map to any industry-specific ID, such as an Ad-ID in digital advertisement. After a few milliseconds, QuickIDs can no longer be used to route traffic to a UE because, for example, the edgecloud (e.g., 716) deletes any association between a UE's identity and the UE's QuickID from the edgecloud's memory-thus, any transmission from an advertiser could not be routed to the correct UE, since the advertiser only knows the QuickID and not the UE's identity. FIG. 4 shows a hypothetical QuickID.

FIG. 4 illustrates an exemplary QuickID 400. The first seven characters uniquely identify the entity (e.g., company), and the six digit prefix code is used to identify the device. In some embodiments, the 6 digit prefix code is optional. For example, the six digit prefix code can be a unique ID (e.g., the industry standard defined Ad-ID, or some other unique identifier). A QuickID can also have a use code, as shown in FIG. 4, for identifying one or more allowed uses for the data in the array. In accordance with some embodiments, for QuickIDs, the time limit in hours is always 0000 to ensure they are not retained longer than a few milliseconds (e.g., no longer than the time needed for processing or routing). The checksum is used to validate the QuickID. In this case, the resulting QuickID is [ABCDEFG001000001ABC123456700000001]. In some embodiments, an identifier (e.g., a QuickID) can include one or more of the aforementioned fields (e.g., but fewer than all).

By contrast, LongIDs can be nearly identical in form to QuickIDs, but allow end users to set time limits for a time limit greater than 0 hours. LongIDs can be generated for each user and entity (e.g., company) with which the end user has agreed to share data. This allows end users to control how long entities have access to different data fields.

Figure 5:
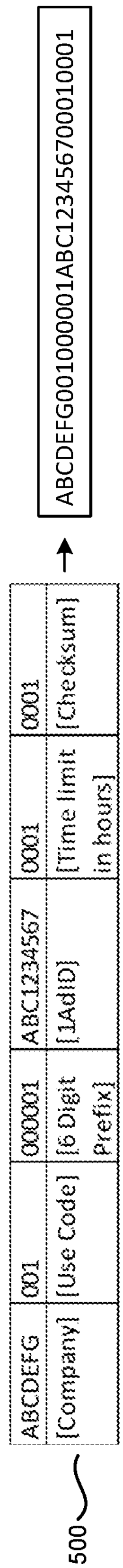
FIG. 5 illustrates an exemplary unique identifier in accordance with some embodiments.

FIG. 5 illustrates an exemplary LongID 500. The first seven characters uniquely identify the entity (e.g., company), the six digit prefix code is used to identify the device. A LongID can also have a use code as described above with respect to the QuickID. For a LongID, the time limit in hours is the number of hours these data may be retained in a database. Of course, other time increments can be used for setting the time limit within a LongID or QuickID. The checksum is used to validate the LongID. In this case, the resulting LongID is [ABCDEFG001000001ABC123456700010001].

The Time limit field can be a predefined value that is default to every LongID that is generated or it can be produced in a more involved manner that takes into consideration one or more of the sensitivity of the information that is stored, the potential demand for this information, and also the user's preferences. For example, in the case of sensitive medical information, it should be possible for certified authorities to be able to request permanent access to certain LongIDs (e.g., blood pressure readings/predictions), for instance, when an ambulance is being dispatched. In some embodiments, an identifier (e.g., a LongID) can include one or more of the aforementioned fields (e.g., fewer than all).

As one of skill should appreciate, the data structure of the QuickID and LongID can include the same fields, where the only distinguishing characteristic between the two is whether the time limit field is set to a zero or non-zero representation of a time limit (e.g., 0000 hours versus 0001 hours). As used herein, and unless otherwise noted, a given identifier can be referred to using one of the terms "QuickID" or "LongID" merely to inform the reader whether the time limit field has a zero or non-zero representation therein. Thus, the terms "QuickID" or "LongID" are used in the present disclosure to aid the reader in understanding time limits associated with the examples used herein, and do not necessarily refer to different data structures. Nothing in this paragraph should be interpreted as explicitly or implicitly stating any two identifiers (e.g., QuickID and LongID) need to include the same type and number of fields (e.g., use code, checksum, or the like) as each other. For example, a QuickID can omit a use code field, whereas a LongID for the same device or data can include the use code field, where the additional difference is that the LongID has a non-zero time limit and the QuickID does not.

As one of skill should further appreciate, where reference is made to a zero time limit or, conversely, a non-zero time limit, Applicant intends such expression of the concepts to include any possible representation of a time limit (or absence thereof), whether expressed numerically (e.g., as a zero) or otherwise (e.g., as a binary YES or NO).

2.1 Assigning 1AdID

Reference is made herein to a 1AdID. The creation of exemplary 1AdIDs is included in PCT Application No. PCT/IB2019/060191, which is incorporated by reference herein. Below, a brief explanation of an exemplary 1AdID generation process is included.

At step 1, an end user triggers a data transaction opportunity (e.g., advertisement opportunity) (e.g., by visiting or launching an application with opportunities to display advertisement, such as a website, application, or video game). In the case of extended reality (XR) advertising, the user can enter a physical location to cause such trigger. The physical location may be obtained via location services, which use global positioning system (GPS), Bluetooth, Wi-Fi or cellular (e.g., 5G) radio signals to estimate the location of the user's device (e.g., 100).

At step 2, the user's device can automatically generate a 1AdID that uniquely identifies the context (e.g., the device, visited application or physical location, etc.). The 1AdID can include, or otherwise be considered, a unique identifier of the user's device (e.g., because it includes some value unique to identifying the user's device, for example, to an edgecloud server or privacy-service provider). In some embodiments, the 1AdID also includes the relevant advertisement opportunities. In this sense, the 1AdID is a collection of data (e.g., packet, array) that includes both a unique identification of the user's device, and accompanying data. Other constructs are possible, and intended to be within the scope of this disclosure—for example, such as where the 1AdID uniquely identifies the user's device but does not include the accompanying context data (but is logically associated with such accompanying context). One of skill would understand the functional equivalence of these various possibilities.

At step 3, the user device (e.g., 100) optionally appends real-time IoT and sensor data to the 1AdID from devices directly connected to the device, if the user has consented to such data sharing. Potential examples of such data to be included with the 1AdID include heartrate monitors, eye gaze trackers, wearable sensors, etc.

At step 3, end users can optionally choose to include a standard packet of demographic information with their 1AdIDs. The packet may be controlled via an application on the user's device (e.g., 100). The packet might include fields such as age, gender, and brand affinities.

At step 4, the 1AdID is then uploaded to an edge or cloud computing facility network node (e.g., 716).

At step 5, after the 1AdID packet reaches the edge or cloud computing facility, it is optionally enriched by combining it with real-time data from sensors and probes located near the end user. This may be performed in parallel, in the edge or cloud computing environment. Examples of IoT data that might enrich the 1AdID include ambient temperature, light, sound, odors, proximity of people, or total number of nearby devices.

At step 6, the full 1AdID packet is optionally processed at the edge or in the cloud (e.g., to assign the end user to their relevant audience(s), or other such predictions or inferences). The processing may be done using machine learning and artificial intelligence. The specific algorithm(s) used for assignment to audience can be proprietary to advertisers (e.g., unique to the advertising opportunity), mobile operators (e.g., unique to all mobile phone service customers), the physical location (e.g., unique to all visitors to an amusement park), or any permutation thereof. For example, the range of possible audiences can be defined qualitatively, using predefined, human-interpretable labels such as "business traveler" or "stay at home parent." They can also be assigned via AI, whereby the audiences may not have easily interpretable labels.

At step 7, after processing, the resulting observation (e.g., audience) and 1AdID are used to generated one or more of a QuickID and LongID, and caused to stored in a database (e.g., 722) as permitted. The 1AdID or the QuickID can be sent, along with a bid request payload that identifies the device and corresponding opportunity, to an advertisement exchange as a bid request.

At step 8, the data used to generate the 1AdID is deleted from the edge or cloud environment.

3. Using Data for Inference

Continuing with the example above, once in the edgecloud, a next step is the data are used for inferencing/predictions per the end user's privacy settings (note: the means of processing data at the edge/in the cloud are well understood and are outside the scope of this application, and therefore not discussed in further detail).

Once inferencing is complete, the underlying array of data and any resulting inference and/or prediction are dealt with per the end user's privacy settings. In the case where the end user has A) specified that no field may be retained for longer-term use, the array and any resulting prediction and/or inference are deleted/purged from the edgecloud environment (note: the means of purging data from the edge/cloud are well understood and are outside the scope of this application, and therefore not discussed further). In the alternate case where the end user has B) allowed at least one field of raw data, prediction, or inference to be stored, those fields are forwarded from the edgecloud into a database for storage.

Figure 6:
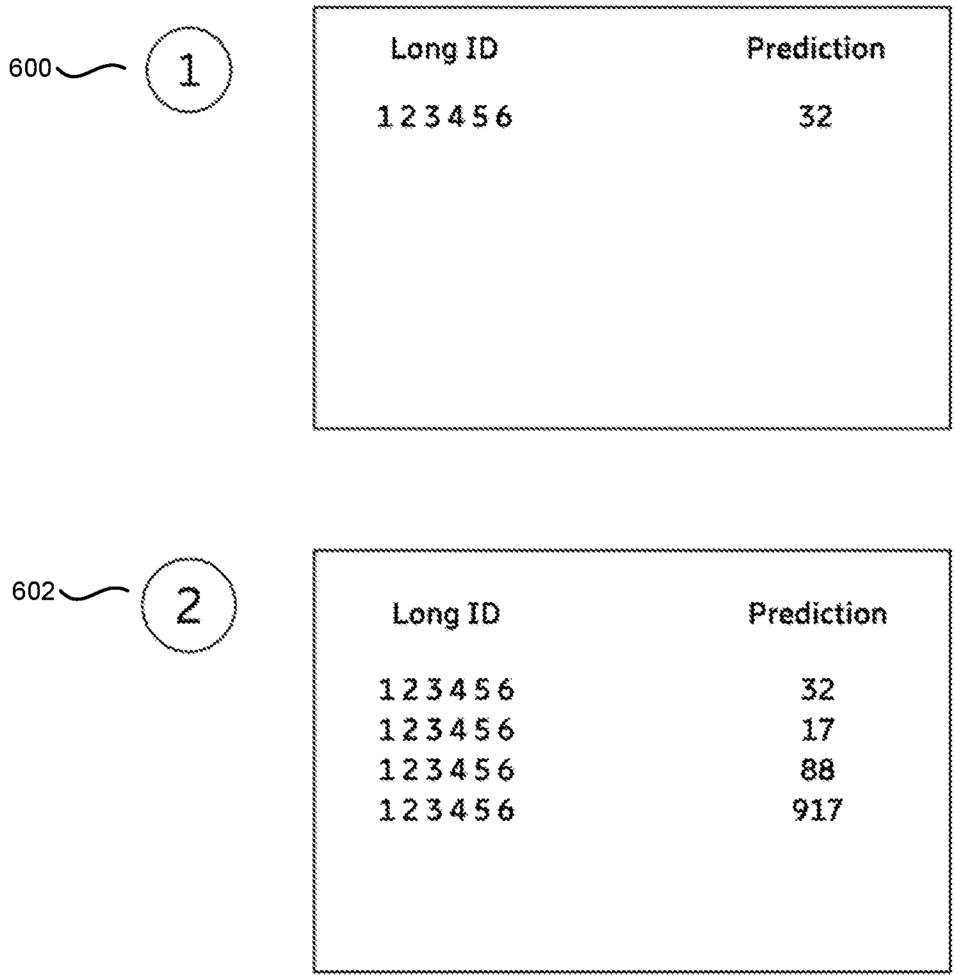
FIG. 6 illustrates exemplary observations associated with a unique identifier in accordance with some embodiments.

FIG. 6 illustrates exemplary sets of data contained within a database. Stage (1) 600 shows one observation (e.g., a prediction) associated with a LongID, while Stage (2) 602 shows multiple such observations (e.g., multiple predictions). As used herein, the terms "observation", "prediction", and "inference" are variously used to refer to additional data resulting from one or more operations performed on the data associated with a LongID. While such terms can denote creation by different types of operations upon initial data, they are used interchangeably herein unless otherwise explicitly noted or prevented by logic, and thus should be interpreted thusly. For example, though predictions are used in the example of FIG. 6, one of skill could see that instead the values illustrated could be observations or inferences, or a combination of more than one of the three. Further, the terms "observation", "prediction", and "inference" are not intended to limit the types of additional data resulting from one or more operations performed on the data associated with a LongID, and are merely used as illustrative terms.

The means of forwarding data or arrays from an edgecloud into a database for storage are well understood and are outside the scope of the present disclosure, and thus are not discussed in further detail. Any appropriate means for two devices, nodes, computers, servers, or the like, can be used.

Moreover, Applicant notes that the techniques described herein are sufficiently generally applicable such that the particulars and configuration of the database—e.g., cloud-based, on premises, relational, etc.—are not important for understanding or enabling implementation of the embodiments described herein.

In this example, the data in the resulting database are stored according to LongID, per edgecloud retention policies. In their privacy settings, each end user can specify how long data are retained for each [COMPANY] or for each [COMPANY]+[USE CODE] pairing. For example, as shown in FIG. 2, an end user may choose to allow data to be stored for thirty (30) days for all of the Mobile Phone Service Provider's use cases, or instead, as shown in FIG. 3, instead specify subsets for Mobile Phone Service Provider's use cases into twelve (12) hours for advertising, thirty (30) days for billing, five (5) days for service optimization, and five (5) days for media.

Figure 7:
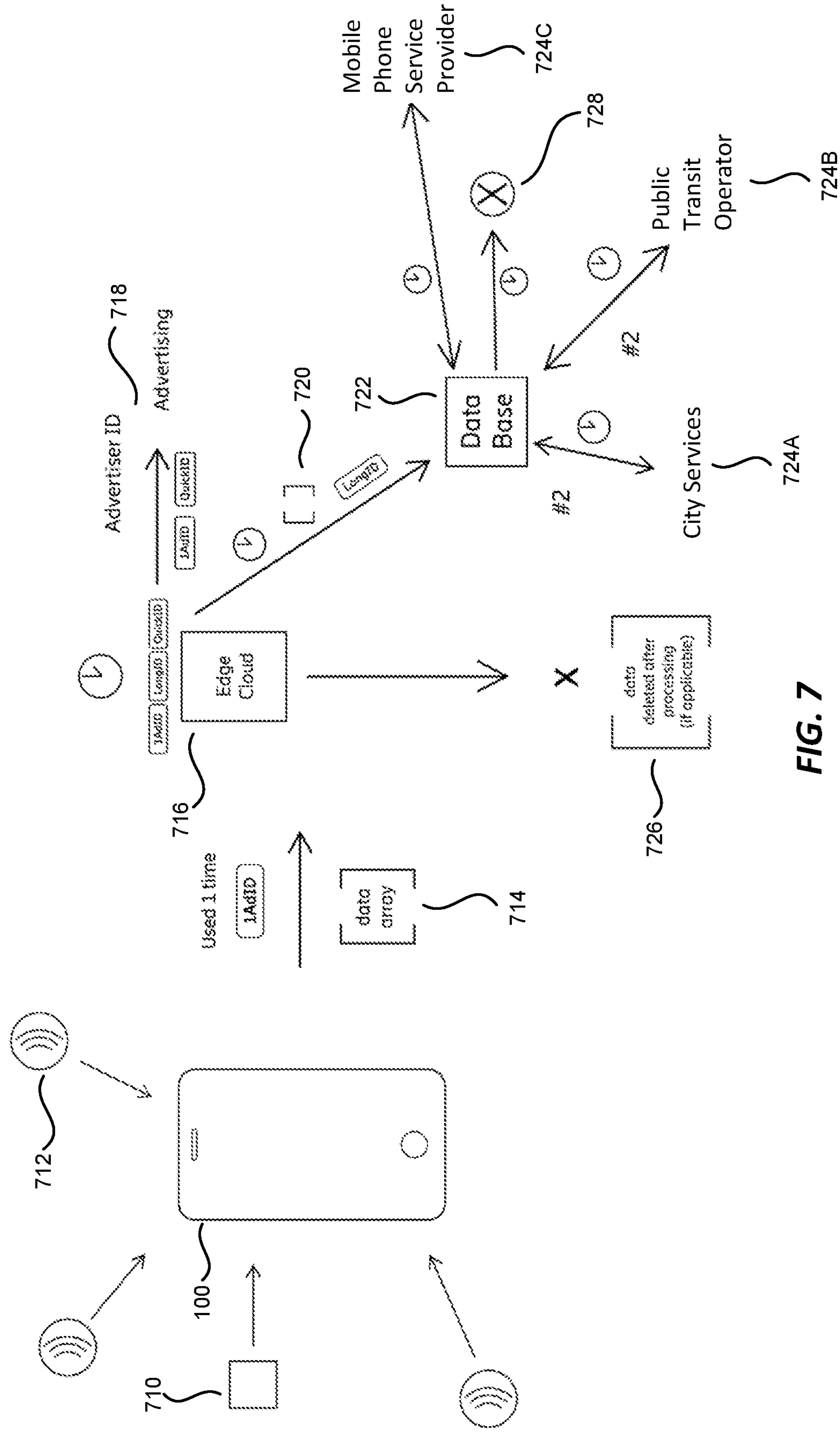
FIG. 7 illustrates operation of an exemplary architecture in accordance with some embodiments.

FIG. 7 illustrates an exemplary schematic of an architecture in accordance with certain embodiments. The deletion indication 728 (a large "X") coming from the database 722 indicates the time-controlled deletion of the relevant data from the database, while the deletion indication 726 coming from the edgecloud represents the immediate deletion of data from the edge after processing.

In accordance with some embodiments, the data are always deleted from the database according to the time limit set by the user. In accordance with some embodiments, as a failsafe, the only field linking an entry in the database to the original UE is the 1AdID, and at least the 1AdID is deleted according to the time limit set by the user. If that 1AdID is changed or deleted, the link between the end user and the data is broken. Moreover, commercial apps and services request data using the LongID, which mean they do not acquire personally identifying information about an end user, such as their UE's MSISDN, IMEI, or IMSI.

In the example of FIG. 7, data 710 exists on, or is otherwise accessible to, UE 100, which can include (e.g., be combined with) data received from external sensor 712, and sent to edgecloud 716 (e.g., a part of a mobile network operator's network). Edgecloud 716 processes the data array 714 as appropriate (e.g., generate a QuickID, generate a LongID, make an inference/prediction/observation). For example, the QuickID (and/or a 1AdID) and associated observation can be sent to an advertiser identified by a unique Advertiser ID 718 (e.g., for receiving a served advertisement to be displayed at the UE). If a non-zero time limit has been set for the data, a LongID 720 and associated data (e.g., observations) can be sent to a database 722 for storage in accordance with the time limit. In some embodiments, one or more of the user data (e.g., raw data) and processed user data (e.g., an observation, prediction, or inference) are sent to the database for storage. As noted above, once the edgecloud 716 is done forwarding the data to the advertiser and the database 722, it is deleted from the edgecloud 716 (as shown by deletion indication 726). This can be done to further ensure that unnecessary copies of the user data are stored. In the example in FIG. 7, the one or more of the LongID and associated data (e.g., the data from the UE, or observations based thereon) can be provided to requesting entities, such as 724A ("City Services"), 724B, "Public Transit Operator"), and 724C ("Mobile Phone Service Provider"), in accordance with the time limit in the LongID.

4. Geo-Fencing

In Section 3 above, data from sensors (e.g., 712, 812, 816, 906, 908) located in an arbitrary physical region nearby the device can be merged with data (e.g., 710) from the 1AdID to enrich it. The region can be defined through dynamically or statically generated geo-fences. Static geo-fences (e.g., 802, 810, and 814 of FIG. 8) can be pre-defined by geo-fence operators and defined as boundaries such as shopping mall floors or areas of a store, city, etc. Dynamically generated geo-fences (e.g., 902, 904 of FIG. 9) can be defined as a radius (or other shape) around a point or location, e.g., a circular area around the mobile device (UE 100 in FIG. 9).

By definition, dynamically generated geo-fences require a flexible definition of the maximum distance at which data are integrated. Setting this distance too physically far out would mean the 1AdID would be enriched with an overwhelming amount of data, while too small would mean too little data would be included. Maximum distance can be defined dynamically depending on the situation, such as availability IoT data, indoor or outdoor locations, etc.

Figure 8:
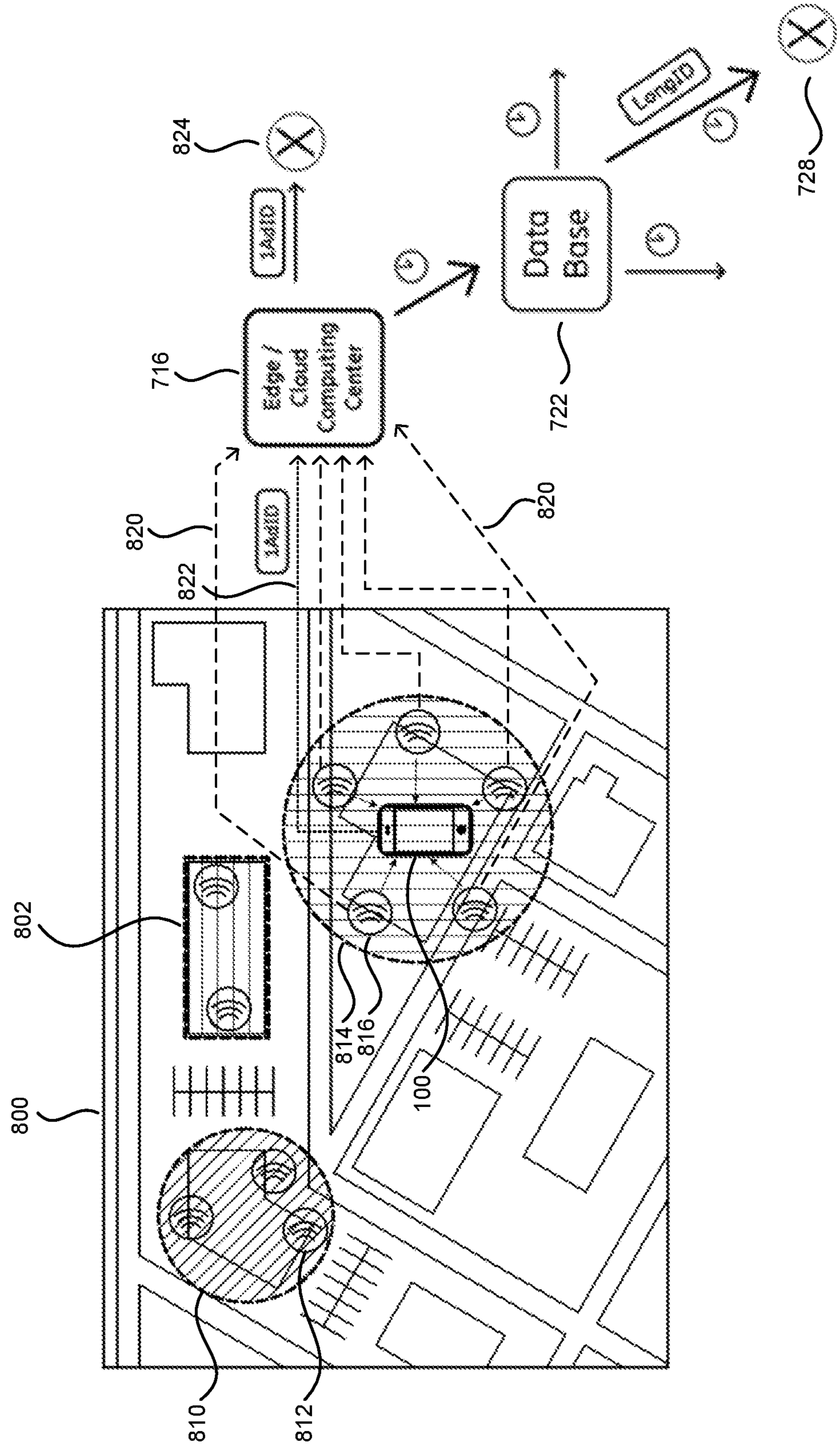
FIG. 8 illustrates operation of an exemplary architecture in accordance with some embodiments.

FIG. 8 illustrates three exemplary static geo-fences (802, 810, and 814) illustrated in a map area 800 of a corporate campus with an end user's mobile device 100 within one of the perimeters (814). Each circular icon with three wave lines (e.g., 812, 816) represents an example sensor, IoT device, or probe located within a respective arbitrary static geo-fence. Data 820 from one or more sensor within the geo-fence 814 belonging to the current location of the mobile UE 100 are included in or with the 1AdID 822 (e.g., data from 816 and the other sensors within 814 is included). While data from a different geo-fence (e.g., 802 and 810) is excluded, even if some of the IoT devices are closer to the mobile device (e.g., if UE 100 were near the top edge of 814, closer to a sensor of 802 than the most distant sensor within 814 near the bottom of the area 814 shown in the map). Similar to as described with respect to FIG. 7, the data is sent to edgecloud 716 for processing. In this example, the 1AdID 822 is deleted (per deletion indication 824). The LongID is forwarded to database 722 for storage in accordance with a time limit, after which it is deleted (per deletion indication 728).

Figure 9:
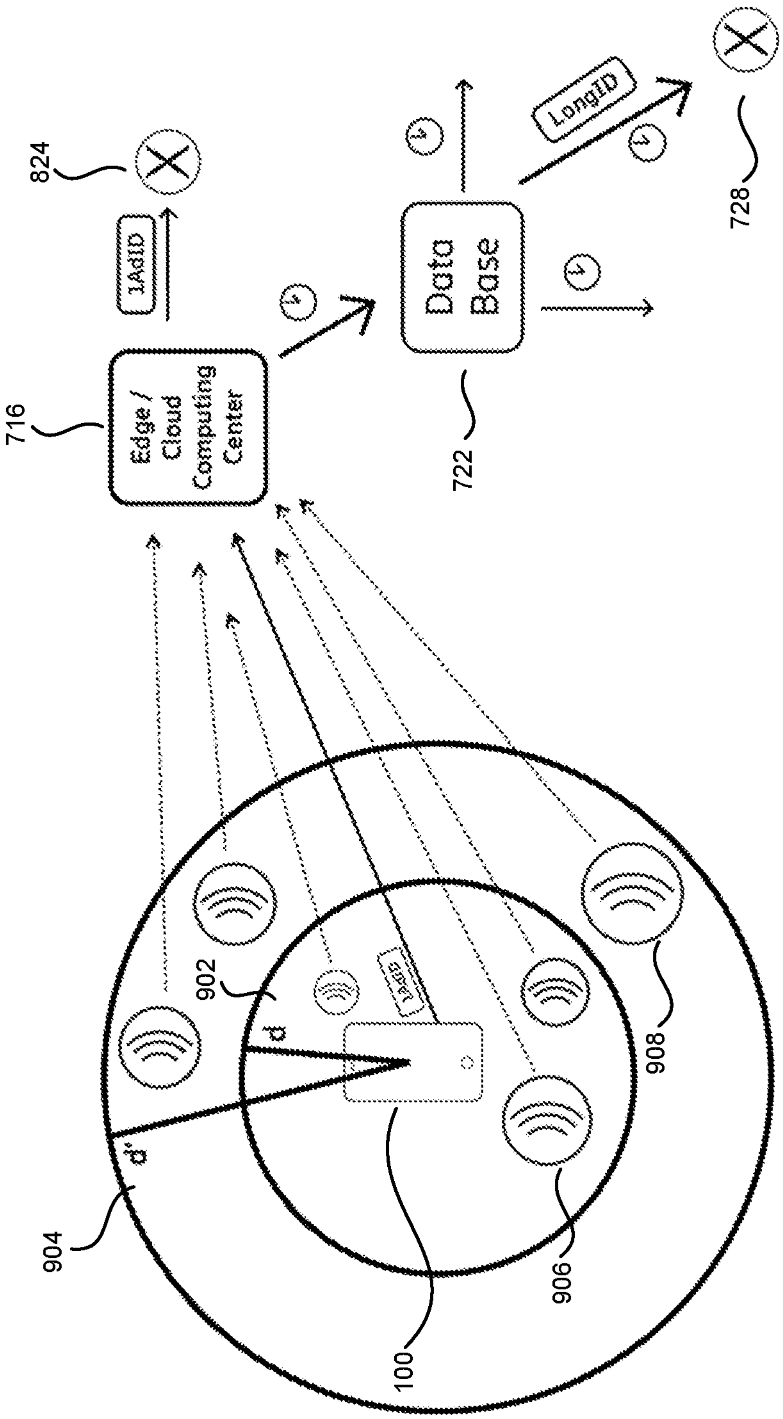
FIG. 9 illustrates operation of an exemplary architecture in accordance with some embodiments.

FIG. 9 illustrates exemplary dynamically generated geo-fences 902 and 904 with an end user's mobile device at its center. Each circular icon with three wave lines (e.g., 906, 908) represents a hypothetical sensor, IoT device, or probe located within the arbitrary physical distance from the mobile device and whose data are in or with the 1AdID. If the distance parameter is set to d, only data from the three sensors contained in the circle 902 with d as a radius are included (e.g., including 906, but not 908). If the distance parameter is set to d', three additional sensors are included (e.g., 908 and the other two sensors in 904 that are not within 902). Similar to as described with respect to FIGS. 7 and 8, 1AdID is sent to edgecloud 716 by UE 100, where it is processed and deleted, and a LongID is sent to database 722. The deletion indication 728 coming from the database 722 indicates the time-controlled deletion of the relevant data, while deletion indication 824 coming from the edge environment 716 represents the near-immediate deletion of the data contained within or accompanying a 1AdID.

Once data of associated devices is uploaded to the Edge/cloud computing center, the 1AdID is used only once to generate the LongID and QuickID. As detailed in Section 3 above, the data are deleted from the database according to the time set by the user. The LongID is sent to the database which can be accessed by authorized entities during the specified time.

5. Movement

For static geo-fences the set of possible sensors, probes, and IoT devices will also update as end users travel within a space. When the mobile device (e.g., 100) transitions from one geo-fence to another data from devices located within the new geo-fence will be included, and devices from the previous geo-fence will not be requested. If they are somehow received by the edge or cloud computing center, they will be discarded and deleted. Devices from overlapping boundaries will continue to be included.

For dynamically generated geo-fences, this invention also includes the idea that the set of possible sensors, probes, and IoT devices will also update as end users travel within a space. After setting a maximum allowed distance, d, data from devices located outside the maximum value of d will not be requested during the 1AdID generation process. If they are somehow received by the edge or cloud computing center, they will be discarded and deleted.

Figure 10:
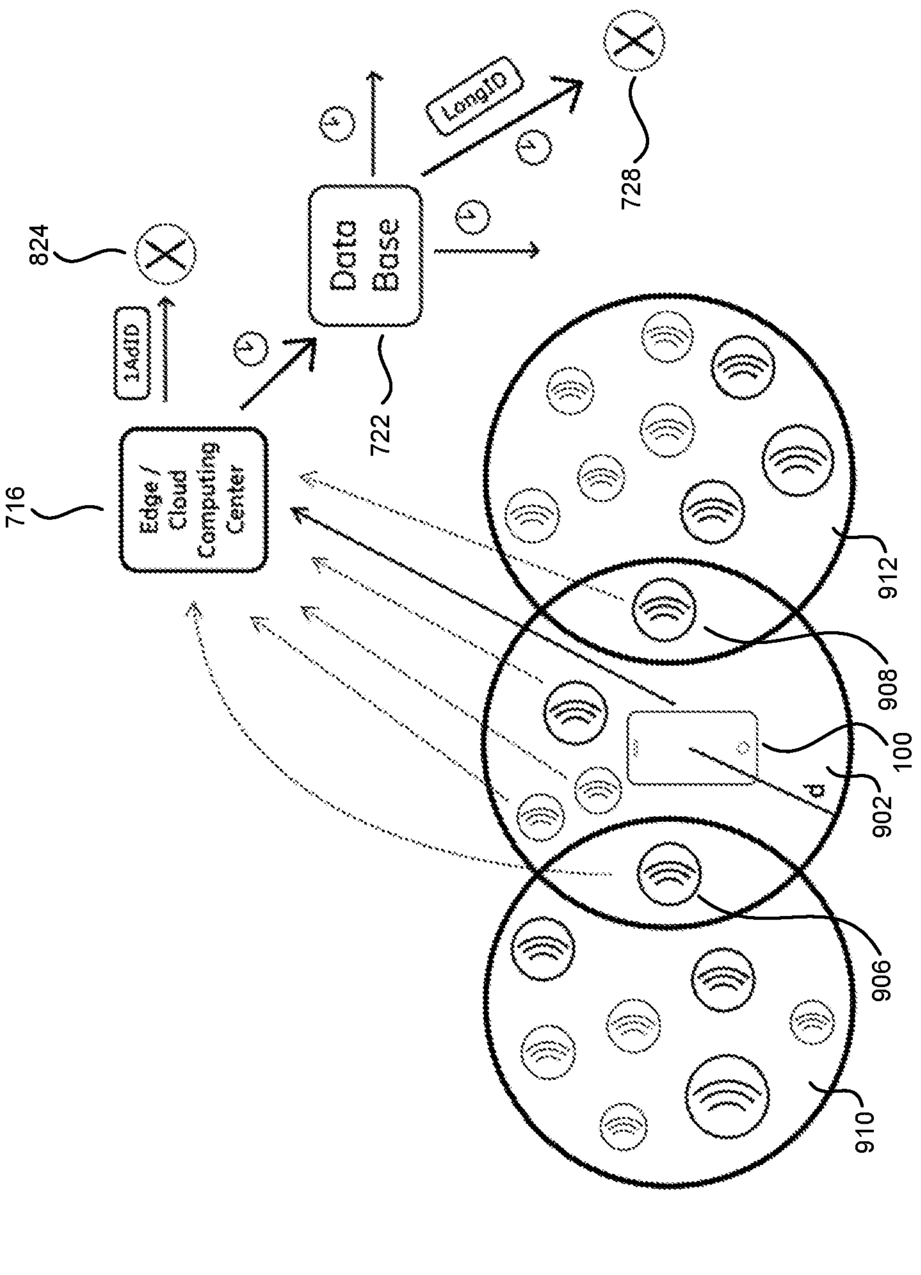
FIG. 10 illustrates operation of an exemplary architecture in accordance with some embodiments.

FIG. 10 illustrates three identical overlapping circles 902, 910, and 912 and an end user's device UE 100. Each circle 902, 910, and 912 represents a geofence (dynamic or static). A dynamic geo-fence can be defined by an arbitrary distance d from the end user device. Each circular icon (e.g., 906, 908) represents a hypothetical sensor, probe, or IoT device. Only devices located within the same geo-fence are included in the 1AdID packet. As the end user moves through space, the set of potential sensors, probes, or IoT devices within geo-fence also changes. Sensors can also be part of more than one geofence (e.g., 906 is within 910 and 902, and 908 is within 902 and 912).

6. Distance

As used herein, one possible measure of distance (e.g., d) is Minkowski distance, as a generalization of both Euclidian and Manhattan distance. The Minkowski distance between points X and Y is defined as:

$$D(X, Y) = \left(\sum_{i=1}^{n} |x_i - y_i|^p\right)^{1/p}$$

The techniques described herein can be agnostic about the origin of the maximum distance allowed for calculation. It could be set as a general privacy setting by the end user, by the mobile operator, or be defined by custodians of facilities to separate different spaces.

7. Algorithms

In some embodiments, a network node (e.g., the edge-cloud, a database) can use one or more algorithm to make observations, inferences, and/or predictions. Any appropriate algorithm can be used. Below, an example is provided using an algorithm of a grouping assignment module. The grouping assignment module is the main module where machine learning and artificial intelligence are used to make the best audience selection given the data contained in the 1AdID packet. Such audience selection can be considered a, or used for, an inference or a prediction, for example.

7.1. Inputs

Various inputs can be used in accordance with certain embodiments, including one or more of:

Data from the end user's device(s): shared according to local privacy settings. If the user opts out of sharing their location, then location data will not be used in the 1AdID generation process. This could also potentially disactivate the inclusion of data from nearby sensors, probes, and IoT devices, according to the end user's privacy settings.

Environmental data: data about the consumer's environment, gathered from IoT devices, sensors, and probes connected located an arbitrary physical distance from the end user's UE.

Policies: The audience assignment process could include configured policies. For example, it could be configured to prioritize assignments to particular types of audiences.

7.2. Outputs

The exemplary grouping assignment module outputs a list of grouping(s) assigned to each 1AdID. This list could include one grouping, or multiple, depending upon the underlying data. As noted above, this is an exemplary model that runs via the architecture described above; it is not the only type of model that can be used with the proposed architecture.

7.3. Model Details

A high-level description of an example implementation is described below, and formulated as a matching problem. The exemplary algorithm is as follows, wherein the input is a list L of 1AdIDs with associated user and environmental data; and a set N of initial candidates for audiences (subsets of L); and wherein the output is a partition of L into a set of groupings:

1) Let N be a set of possible groupings (subsets of L).
2) Let $n_i$ be a set of possible permutations of AI-defined groupings $N_i$.
3) Let G be the empty graph.
4) For each element $n_i$ of N:
   a) Add a node $n_i$ to G.
   b) For each node vertix $n_j$
      i) Connect $n_i$ to all node vertices if and only if it is a suitable grouping, as determined by an oracle; otherwise, $n_i$ is left unconnected.
      ii) Assign a capacity of $c(n_i, n_j)$ to each edge $(n_i, n_j)$ and assign an existing flow $w(n_i, n_j) <= c(n_i, n_j)$.
5) Add a source S that is connected out to each node in G by an edge with $c(S, n_i)$=infinity, $w(S, n_i)=1$, for all $n_i$ in G.
6) Add a sink node T with edge $(n_i, T)$ for each node $n_i$ in G\S; the capacity of each edge should be $\max(c(n_j, n_i))$.
7) Solve for maximum flow, such as by applying the Ford-Fulkerson algorithm.
8) Output the solved flow, which is the optimal grouping choice (note: flows must be non-negative, as there is no optimal solution for negative flows without DAGs).

8. Example Data Format

This section gives examples of the required data. The data examples below are represented as XML objects, but they could be represented as JSON or other formats. In the below example, the data sample comes from a female end user with a heartrate monitor entering a bookstore, which has a sound monitor installed. These examples are non-exhaustive in terms of content.

8.1. IoT Data

```
<message from='device@example.org'
    to='client@example.org/amr'>
  <fields xmlns='urn:xmpp:iot:sensordata' seqnr='1' done='true'>
```

-continued

<node nodeId='Device01'>
<timestamp value='2019-03-07T16:24:30'>
<numeric name='Heartrate' momentary='true'
automaticReadout='true' value='76' unit='BPM'/>
</timestamp>
</node>
</fields>
</message>

8.2. Demographic Packet Data

<message from='device@example.org'
to='client@example.org/amr'>
<fields xmlns='urn:xmpp:iot:sensordata' seqnr='1' done='true'>
<node nodeId='Device01'>
<timestamp value='2019-03-07T16:24:30'>
<numeric name='Gender' momentary='true'
automaticReadout='true' value='F' unit='Gender'/>
</timestamp>
</node>
</fields>
</message>

8.3. Sensor Data

<message from='device@example.org'
to='client@example.org/amr'>
<fields xmlns='urn:xmpp:iot:sensordata' seqnr='1' done='true'>
<node nodeId='Device01'>
<timestamp value='2019-03-07T16:24:30'>
<numeric name='Sound' momentary='true'
automaticReadout='true' value='87' unit='Decibels'/>
</timestamp>
</node>
</fields>
</message>

Figure 11:
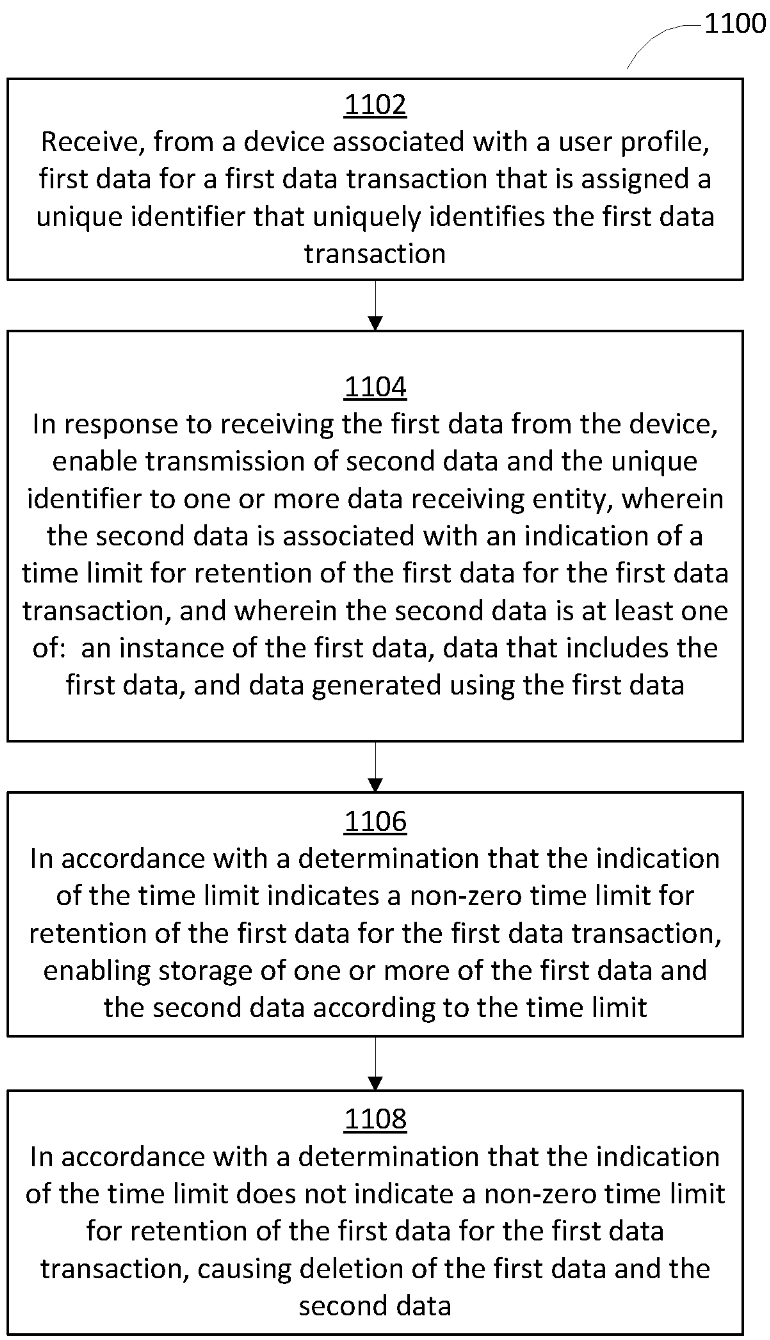
FIG. 11 an exemplary process in accordance with some embodiments.

FIG. 11 illustrates an exemplary process 1100 for managing data subject in accordance with a retention time limit in accordance with some embodiments. Process 1100 can be performed by one or more network node, electronic device, and system as described herein (e.g., 716, 1460, 1600, 1730, 1810, 1820). The techniques and embodiments described with respect to process 1100 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process. Additionally, the various embodiments, elements, or operations described below with respect to process 1100 can be combined in any combination with each other, or be omitted from such combination, and any such combination is within the scope of this disclosure.

A network node (e.g., 716, 1460, 1600, 1730, 1810, 1820) receives (1102), from a device (e.g., 100) associated with a user profile (e.g., comprising account settings, preferences, or other privacy-controlling data) (e.g., an account identified by 112), first data (e.g., location data, transaction data, or other user data) (e.g., 400, 500, 714, 820, 822, 820) for a first data transaction (e.g., an interaction that involves exchange of data between a UE and a network node) that is assigned (e.g., by the network node, by an external device or server) a unique identifier (e.g., 1AdID, QuickID, LongID) that uniquely identifies the first data transaction (e.g., a one-time use identifier, or a persistent identifier for the device). As used herein "unique identifier" can refer to an identifier without accompanying data (e.g., personal data, data transaction context data), or an identifier that is included with accompanying data (e.g., 1AdID, QuickID, LongID), unless otherwise noted. Where reference is made separately to a unique identifier and accompanying data (e.g., personal data, first data), such recitation should not be construed as preventing such elements from being interpreted as being included within the same data structure/container (e.g., 1AdID, QuickID, LongID).

In response to receiving the first data from the device, enabling (1104) transmission (e.g., either directly by the network node (edgecloud) to advertisers via 1AdID or QuickID, or by a server via LongID) of second data (e.g., 1AdID, QuickID, LongID, an observation/inference/prediction) and the unique identifier to one or more data receiving entity (e.g., company) (e.g., 724A, 724B, 724C). In accordance with some embodiments, the second data (e.g., 400, 500) is associated with (e.g., includes) an indication of a time limit (e.g., [Time limit in hours] in FIG. 4 or 5) for retention of the first data for the first data transaction (e.g., data is deleted upon expiration of the time limit). In accordance with some embodiments, the second data is at least one of: an instance of the first data (e.g., copy, or the original raw data), data that includes the first data (e.g., first data plus additional data), and data generated using the first data (e.g., is an inference or prediction based on the first data).

In accordance with a determination that the indication of the time limit indicates a non-zero time limit for retention of the first data for the first data transaction, enabling (1106) storage (e.g., storing, or allowing a remote server to store) of one or more of the first data and the second data (e.g., a LongID, an observation/inference/prediction associated with a LongID) according to the time limit (e.g., at a remote server, such as database 722 or 1740).

By using an architecture that utilizes a network node (e.g., 716) between a user's device (e.g., 100) and a database (e.g., 722) to process personal or otherwise privacy-sensitive user data, along with processes and/or data containers for strictly enforcing deletion policies, a database and/or any data requesting entity can be prevented from discovering a user's true identity and/or from aggregating data indefinitely from such user.

In accordance with a determination that the indication of the time limit does not indicate a non-zero time limit for retention of the first data for the first data transaction, causing (1108) deletion of the first data and the second data (e.g., subsequent to enabling transmission of the second data and the unique identifier to the one or more data receiving entity) (e.g., from the network node itself). For example, the edgecloud causes deletion by the database by including the time limit in the LongID, after which the database must delete the associated data (e.g., per 728). For further example, the edgecloud deletes the second data from its own memory after transmitting a LongID to the database (e.g., per 726).

In some embodiments, the unique identifier is assigned by the device (e.g., 100) or the network node (e.g., 716). For example, the 1AdID, LongID, or QuickID can be generated by the end user's device or by the edgecloud.

In some embodiments, the network node performs one or more processes on the first data to generate the second data. For example, the edgecloud can performe data processing (e.g., inference, prediction, or other algorithm) on the first data to generate second data. For further example, the generation of the second data can be generation of a LongID from a 1AdID and data from the user's UE and any associated sensor data.

In some embodiments, the unique identifier (e.g., QuickID, LongID) includes one or more of the following: a use code (e.g., as in 400 or 500) identifying at least one permitted use of the second data; and an entity identifier (e.g., [Company] field as in 400 or 500) identifying at least one entity that is permitted to access the second data.

In some embodiments, the unique identifier (e.g., 1AdID, QuickID, LongID) maintains anonymity of the device (e.g., 100) and the user profile from the one or more data receiving entity (e.g., 724A, 724B, 724C) that receives transmission of or access to the second data (e.g., LongID). For example, the unique identifier maintains anonymity (privacy) of the device and any user associated with the user profile from the perspective of the receiving entities (e.g., 3rd party company does not receive personally identifiable information with the unique identifier(s)).

In some embodiments, the unique identifier (e.g., 1AdID, QuickID, LongID) is a one-time use identifier such that a different unique identifier is used for a second data transaction involving the device (e.g., 100) associated with the user profile (e.g., even if the second data transaction involves the same or similar data, or the same or different entity). For example, the LongID is deleted after its respective time limit and is not used again, or a 1AdID or QuickID are deleted after the data transaction is completed (e.g., end user provides response or edgecloud node performs analysis) and is not used again.

In some embodiments, enabling storage (e.g., storing, or allowing a remote server to store) of one or more of the first data and the second data according to the time limit comprises one or more of the following: storing, by the network node (e.g., 716), the second data in data storage according to the time limit; and transmitting, by the network node, the second data to one or more database nodes (e.g., 722) (e.g., within the operator's network, or external from the network) for storage according to the time limit. In some embodiments, in conjunction with (e.g., at the same time, or close in time with) the network node (e.g., an edgecloud node) enabling storage of one or more of the first data and the second data (e.g., transmitting all or a portion of it), the network node deletes one or more of the first data (e.g., 1AdID) and the second data (e.g., QuickID, LongID, an observation/inference/prediction) from its own storage (e.g., 726) (e.g., after processing and/or before expiration of the time limit). For example, an edgecloud node can perform processing of the first data to generate the second data, then cause the result of that processing to be stored in a database (e.g., 722) for access by a permitted entity (e.g., 724A, 724B, 724C). To protect user privacy, such generated data (e.g., second data) and source data (e.g., first data) is deleted from the edgecloud node after processing and transmission, such that a permitted entity would need to access the processed data from the database. Thus, the edgecloud node can delete the second data (and first data) before expiration of any time limit (e.g., 726). This can further protect user privacy by reducing the number of instances of data that needlessly exist concurrently.

In some embodiments, the network node further: causes deletion of one or more of the first data and the second data before or upon expiration of (e.g., immediately after) the time limit. For example, the network node deletes (e.g., 726) one or more of the first data and the second data from its own memory subsequent to processing the first data to generate the second data, but before expiration of the time limit, but causes storage (e.g., transmits 720) the second data in a database (e.g., 722).

In some embodiments, the time limit is a first time limit, and the second data is a first type of data that is subject to the first time limit. In some embodiments, third data, received from the device (e.g., 100) or generated by the network node (e.g., 716) based on data received from the device, is a second type of data that is different than the first type of data, and the third data is subject to a second time limit different than the first time limit for at least the reason that the third data is the second type of data. For example, different types of data (e.g., location data, purchase data, advertising data, billing data, media data, etc.) from same user/profile can have different time limits.

In some embodiments, method of any of claims 1-9, wherein the user profile includes one or more user-configured time limits that includes the time limit. For example, a user can use interfaces 110, 210, and/or 310 to configure one or more time limits that are then associated with the user's profile, and used when creating LongIDs.

In some embodiments, the one or more user-configured time limits are specified respectively per one or more of: an identity of the receiving entity (e.g., by company), a type of use (e.g., using a use code), or a type of data (e.g., location data, purchase data).

Figure 12:
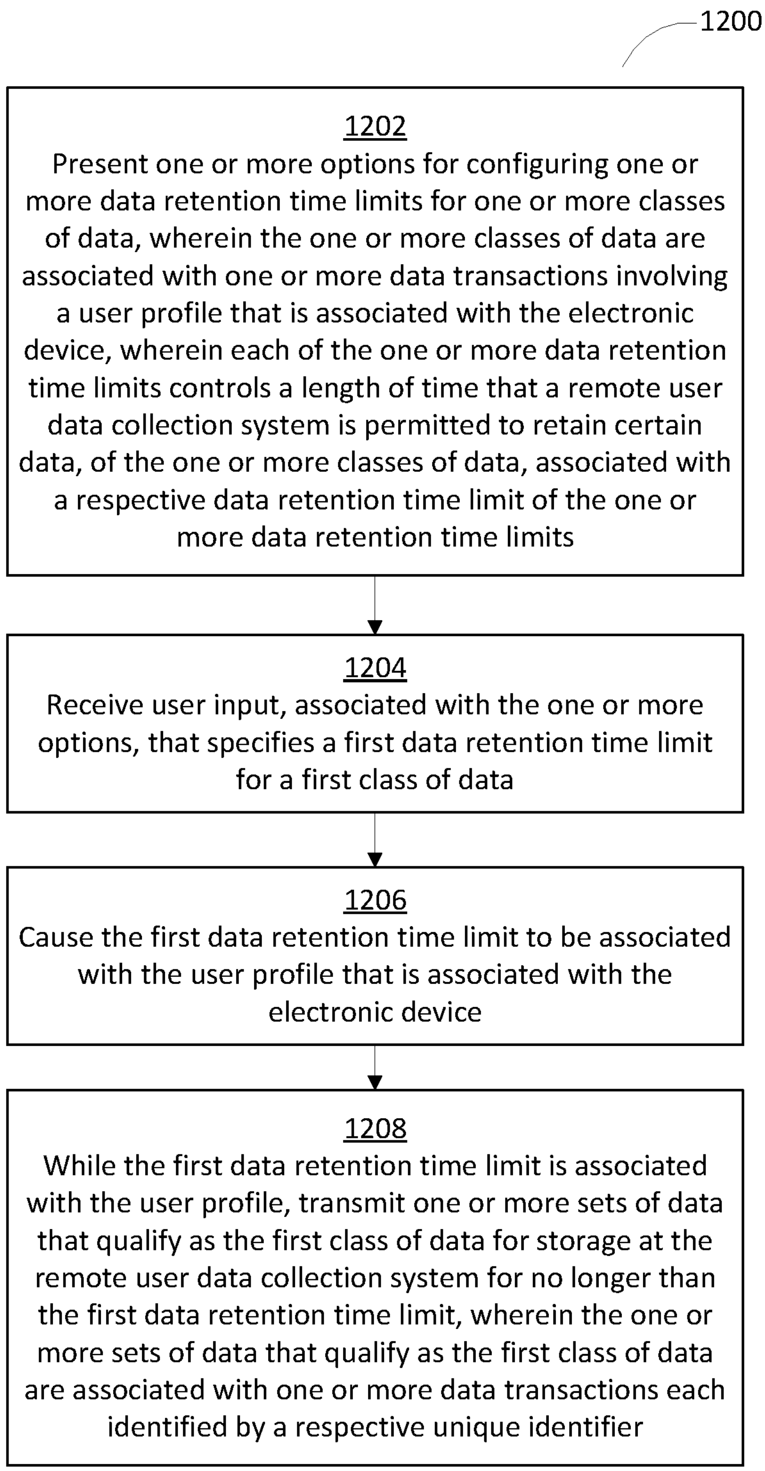
FIG. 12 an exemplary process in accordance with some embodiments.

FIG. 12 illustrates an exemplary process 1200 for managing data subject in accordance with a retention time limit in accordance with some embodiments. Process 1200 can be performed by one or more network node, electronic device, and system as described herein (e.g., 100, 1410, 1500, 1600, 1791, 1792, 1830). The techniques and embodiments described with respect to process 1200 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process. Additionally, the various embodiments, elements, or operations described below with respect to process 1200 can be combined in any combination with each other, or be omitted from such combination, and any such combination is within the scope of this disclosure.

An electronic device (e.g., 100, 1410, 1500, 1600, 1791, 1792, 1830) presents (1202) one or more options (e.g., 120, 122, 124, 126, 128, 130, 220, 222, 224, 226, 320, 322, 324, 326, 328) for configuring one or more data retention time limits (e.g., [Time limit in hours] in FIG. 4 or 5) for one or more classes of data (e.g., data from a particular device; data destined for a particular 3rd party requester (e.g., an entity such as a company); a use type for the data (e.g., billing, advertisement, service optimization, media); a type of data (e.g., location, fitness, transaction data)). In some embodiments, the one or more classes of data are associated with one or more data transactions (e.g., opportunities or requests to provide data) involving a user profile (e.g., comprising account settings, preferences, or other privacy-controlling data) (e.g., profile identified by 112) that is associated with the electronic device (e.g., 100) (e.g., electronic device is logged into the user profile, or is stored as an electronic device associated with the profile). In some embodiments, each of the one or more data retention time limits controls a length of time that a remote user data collection system (e.g., 716, 722) is permitted to retain certain data (e.g., a unique identifier such as a 1AdID, QuickID, or LongID, and/or all of the underlying data), of the one or more classes of data, associated with a respective data retention time limit of the one or more data retention time limits.

The electronic device receives (1204) user input (e.g., via a user input device, such as a touch sensitive surface/screen, mouse, keyboard, microphone, etc.) (e.g., touch input at a touchscreen of UE 100), associated with the one or more options, that specifies a first data retention time limit (e.g., no data retention allowed, 1 day, 7 days, 1 month, 1 year, etc.) for a first class of data (e.g., data for company A). For example, as shown in FIG. 2, UE 100 receives user input at user interface 210 selecting a time limit of 30 days for data for Mobile Phone Service Provider (an exemplary first class of data). As another example, the first class of data can be billing data, which is set using user interface 310 in FIG. 3.

The electronic device causes (1206) the first data retention time limit (e.g., 30 days in FIG. 3) to be associated with the user profile that is associated with the electronic device (e.g., causing it to be sent to edgecloud or server, such as 716).

While the first data retention time limit is associated with the user profile, the electronic device transmits (1208) one or more sets of data (e.g., 714) that qualify as the first class of data (e.g., data for company A) for storage at the remote user data collection system for no longer than the first data retention time limit (e.g., 30 days). In some embodiments, the one or more sets of data that qualify as the first class of data are associated with one or more data transactions each identified by a respective unique identifier (e.g., a 1AdID, QuickID, LongID). As described above, the one or more sets of data and the respective unique identifier can be included together in a single packet or construct, such as a 1AdID, QuickID, or LongID.

In some embodiments, the electronic device (e.g., 100) receives user input (e.g., via a user input device, such as a touch sensitive surface/screen, mouse, keyboard, microphone, etc.), associated with the one or more options, that specifies a second data retention time limit (e.g., no data retention allowed, 1 day, 7 days, 1 month, 1 year, etc.) for a subset of the first class of data (e.g., for billing data for company A). For example, a user uses user interface 310 to provide user input setting a time limit of 30 days for billing data as shown in FIG. 3. In this example, the first class of data is data for Mobile Phone Service Provider, and the subset of the first class of data is billing data. The electronic device causes the second data retention time limit to be associated with the user profile that is associated with the electronic device (e.g., causing it to be sent to edgecloud or server, such as 716). While the second data retention time limit is associated with the user profile, the electronic device transmits one or more sets of data (e.g., 714) that qualify as the subset of the first class of data (e.g., data for company A) for storage at the remote user data collection system (e.g., 722) for no longer than the first data retention time limit or the second data retention time limit (e.g., for no longer than the shorter time limit of the first data retention time limit and the second data retention time limit; the second data retention time limit can also override the first, such that the second data retention time limit is used because it is more granularly defined (e.g., for a subtype)). For example, if the first data retention time limit for the first type of data is set to 30 days, and the second data retention time limit for the subset of data of the first type is 5 days, then the data of the subset is deleted after 5 days, even though it falls under the first type of data, because the 5 day limit is more restrictive than 30 days.

In some embodiments, the electronic device (e.g., 100) receives user input (e.g., via a user input device, such as a touch sensitive surface/screen, mouse, keyboard, microphone, etc.), associated with the one or more options, that specifies a third data retention time limit (e.g., no data retention allowed, 1 day, 7 days, 1 month, 1 year, etc.) for a second class of data (e.g., data for company B, billing data). In some embodiments, the third data retention time limit is different than the first data retention time limit (e.g., 5 days is different than 30 days). In some embodiments, the second class of data is different than the first class of data (e.g., the second class of data is data for company B, and the first class of data is data for company A). In some embodiments, the electronic device causes the third data retention time limit to be associated with the user profile that is associated with the electronic device (e.g., causing it to be sent to edgecloud or server). In some embodiments, while the third data retention time limit is associated with the user profile, the electronic device transmits one or more sets of data (e.g., 714) that qualify as the second class of data for storage at the remote user data collection system (e.g., 722) for no longer than the third data retention time limit, wherein the one or more sets of data that qualify as the second class of data are associated with one or more data transactions each identified by a respective unique identifier. For example, electronic device 100 receives user input (e.g., via user interfaces like 210 and 310) establishing a third data retention time limit of 5 days that is associated with the entity City Services (224), which are different than the limit of 30 days for entity Mobile Phone Service Provider, as shown in FIG. 2.

In some embodiments, a given class of data (e.g., first class, second class) is defined in terms of one or more of the following: an identity of an origin device (e.g., UE 100), of one or more electronic devices associated with the user profile, that is the source of the respective data (e.g., 714); a destination receiving entity (e.g., company A) (e.g., 724A, 724B, 724C) that is to be provided access to (e.g., receives a transmission of) the respective data; a use type for the respective data (e.g., advertising, billing, service optimization, media) (e.g., [Use Code] as in FIG. 4 or 5); and a type of the respective data (e.g., fitness, location, transaction data). In some embodiments, the use type for the respective data includes one or more of the following: advertising, billing, service optimization, and media. In some embodiments, the type of the respective data includes one or more of the following: fitness data, location data, and financial transaction data.

A piece of data can fall into multiple classes (e.g., can be both billing related and destined for company A), and would be subject to the strictest retention policy applicable (e.g., company A is allowed to keep user's data no longer than 30 days, but for billing only 7 days means that info for billing use is inaccessible to company A after 7 days).

In some embodiments, data can qualify as one or more classes of data. In some embodiments, data that qualifies as more than one class of data, of the one or more classes of data, is subject to the shortest data retention time limit for the respective classes of data of the more than one class of data. For example, data that qualifies as both the first class of data and the second class of data will be deleted in accordance with the shorter data retention time limit of the respective first and second classes.

Figure 13:
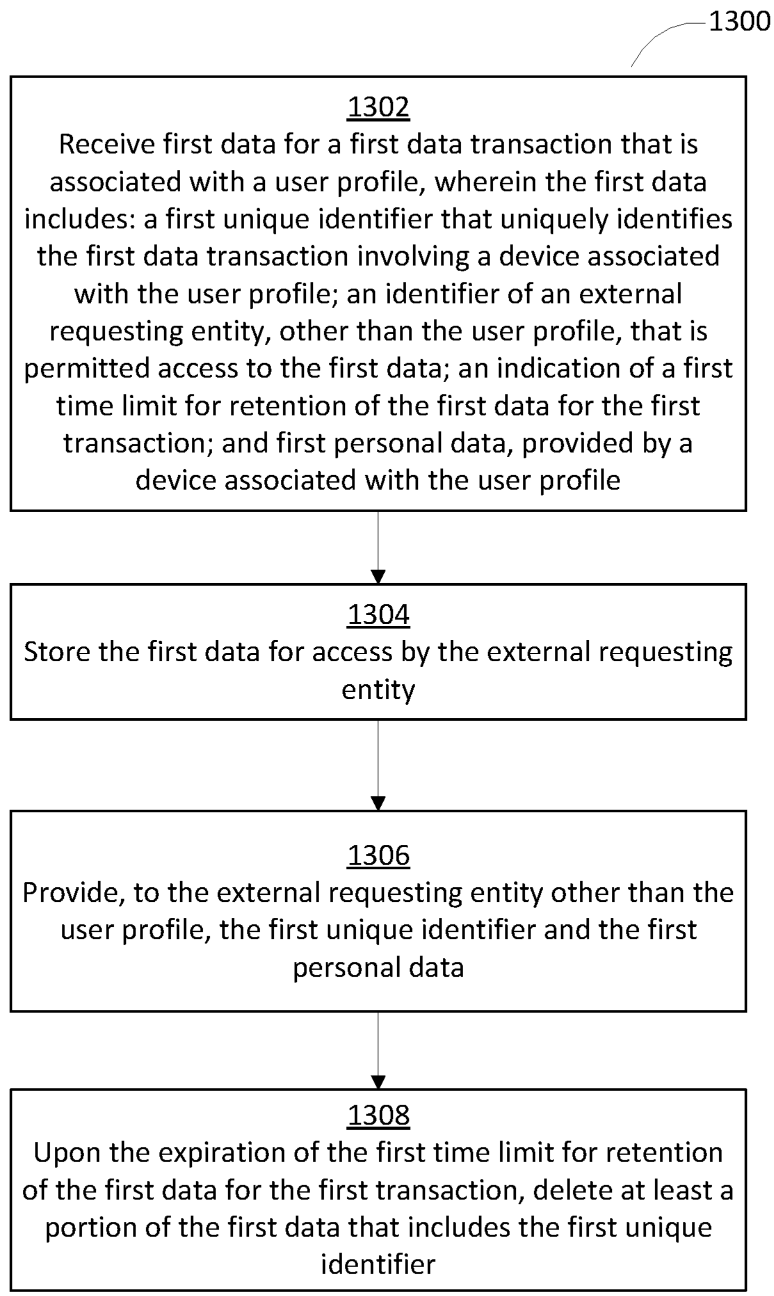
FIG. 13 an exemplary process in accordance with some embodiments.

FIG. 13 illustrates an exemplary process 1300 for managing data subject in accordance with a retention time limit in accordance with some embodiments. Process 1300 can be performed by one or more network node, electronic device, and system as described herein (e.g., 716, 722, 1460, 1600, 1730, 1740, 1810, 1820). The techniques and embodiments described with respect to process 1300 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process. Additionally, the various embodiments, elements, or operations described below with respect to process 1300 can be combined in any combination with each other, or be omitted from such combination, and any such combination is within the scope of this disclosure.

The network node (e.g., 716, 722, 1460, 1600, 1730, 1740, 1810, 1820) receives (1302) (e.g., from another network node, such as an network edge node 716) first data (e.g., location data, transaction data, or other user data) (e.g., 720) for a first data transaction that is associated with a user profile (e.g., comprising account settings, preferences, or other privacy-controlling data) (e.g., identified by 112), wherein the first data includes: a first unique identifier (e.g., 1AdID, LongID) that uniquely identifies the first data transaction involving a device associated with the user profile (e.g., a one-time use identifier, or a persistent identifier for the device); an identifier of an external requesting entity (e.g., [Company] code field as in FIGS. 4 and 5), other than the user profile, that is permitted access to (e.g., at least a portion of) the first data (e.g., a company code); an indication of a first time limit (e.g., [Time limit in hours] as in FIGS. 4 and 5) for retention of the first data for the first transaction; and first personal data (e.g., 710, data in a 1AdID), provided by a device (e.g., 100) associated with the user profile. For example, the database 722 receives a LongID that includes a 1AdID with personal data associated with the user profile (e.g., a prediction or inference based on user data, or the actual user data (such as location information)).

The network node stores (1304) the first data for access by the external requesting entity (e.g., 724A, 724B, 724C) (e.g., a third party device/system/user that is not the user or the server).

The network node provides (1306), to the external requesting entity other than the user profile, the first unique identifier and the first personal data. For example, database 722 provides one or more of entities 724A, 724B, and 724C with the 1AdID or LongID and associated personal data (e.g., a inference).

Upon the expiration of the first time limit for retention of the first data for the first transaction, the network node deletes (1308) at least a portion of the first data that includes the first unique identifier (e.g., as shown by 728) (e.g., deletes at least the 1AdID, deletes the entire LongID, deletes all underlying data associated with the first transaction). For example, by deleting at least the 1AdID, the connection to the user's device 100 is broken and the database cannot connect any remaining data with the user's profile.

In some embodiments, the network node receives (e.g., from another network node, such as an network edge node) second data (e.g., location data, transaction data, or other user data) for a second data transaction that is associated with the user profile (e.g., comprising account settings, preferences, or other privacy-controlling data), wherein the second data includes: a second unique identifier (e.g., 1AdID, LongID) that uniquely identifies the second data transaction involving the device associated with the user profile (e.g., a one-time use identifier, or a persistent identifier for the device); the identifier of the external requesting entity, other than the user profile, that is permitted access to (e.g., at least a portion of) the second data (e.g., a company code); an indication of a second time limit for retention of the second data for the second transaction; and second personal data, provided by the device associated with the user profile, wherein the first personal data is a first type of data and the second personal data is a second type of data different from the first type of data, wherein the first type of data is subject to the first time limit for retention and the second type of data is subject to the second time limit for retention, and wherein the second time limit is different than the first time limit. The network node stores the second data for access by the external requesting entity. The network node provides, to the external requesting entity other than the user profile (e.g., a third party device/system that is not the user or the server), the second unique identifier and the second personal data. Upon the expiration of the second time limit for retention of the second data for the second transaction, the network node deletes at least a portion of the second data that includes the second unique identifier. For example, database 722 receives second data for the user profile, the second data includes a different time limit for the same type of data (e.g., different use (e.g., based on use code) of the same type of data is subject to different time limit), and stores a second instance of the data.

In some embodiments, the external requesting entity is a first external requesting entity (e.g., 724A), and the network node receives (e.g., from another network node, such as an network edge node) third data (e.g., location data, transaction data, or other user data) for a third data transaction that is associated with the user profile (e.g., comprising account settings, preferences, or other privacy-controlling data), wherein the third data includes: a third unique identifier (e.g., 1AdID, LongID) that uniquely identifies the third data transaction involving a device associated with the user profile (e.g., a one-time use identifier, or a persistent identifier for the device); an identifier of a second external requesting entity, other than the user profile, that is permitted access to at least a portion of the third data (e.g., a company code), wherein the first external requesting entity (e.g., 724A) is different than the second external requesting entity (e.g., 724B); an indication of a third time limit for retention of the third data for the third transaction, wherein data access permission for the first external requesting entity is subject to the first time limit for retention and data access permission for the second external requesting entity is subject to the third time limit for retention, and wherein the third time limit is different than the first time limit; and third personal data, provided by a device associated with the user profile. The network node stores the third data for access by the second external requesting entity. The network node provides, to the second external requesting entity other than the user profile (e.g., a third party device/system that is not the user or the server), the third unique identifier and the third personal data. Upon the expiration of the third time limit for retention of the third data for the third transaction, the network node deletes at least a portion of the third data that includes the third unique identifier (e.g., as shown by 728). For example, the network node receives third data for the user profile that includes different time limit for a different requesting entity (e.g., company B), even if the third data is the same as the first data.

In some embodiments, prior to the expiration of the first time limit, the network node receives a request, from the external requesting entity (e.g., 724A), to access data from the first data including at least the first unique identifier and the first personal data, wherein the first unique identifier and the first personal data is provided in response to receiving the request. For example, database 722 receives a request for data from the external entity 724A, and in response provides a 1AdID or LongID with associated personal data. In some embodiments, the first data includes a permitted use code, wherein the request (e.g., by 724A) includes a requested use code (e.g., a use code representing how the requester will use the requested data), and the network node determines that the permitted use code matches the requested use code prior to providing the first unique identifier and the first personal data to the external requesting entity. For example, the first data includes a permitted use code, and wherein the requesting entity is provided the requested data in accordance with the request including a permitted use code.

In some embodiments, deleting the at least the portion of the first data includes deleting the first personal data. For example, the database deletes personal data (as part of or in addition to deleting the unique identifier, such as the 1AdID or LongID).

In some embodiments, the first unique identifier maintains anonymity (privacy) of the device and the user profile from the external requesting entity. For example, even if the requesting entity knows the 1AdID or LongID, it cannot use such information (alone) to derive the identity of the user profile and/or device.

Additionally, the various embodiments, elements, or operations described below with respect to processes 1100, 1200, and/or 1300 can be combined in any combination with each other, or be omitted from such combination, and any such combination is within the scope of this disclosure.

Figure 14:
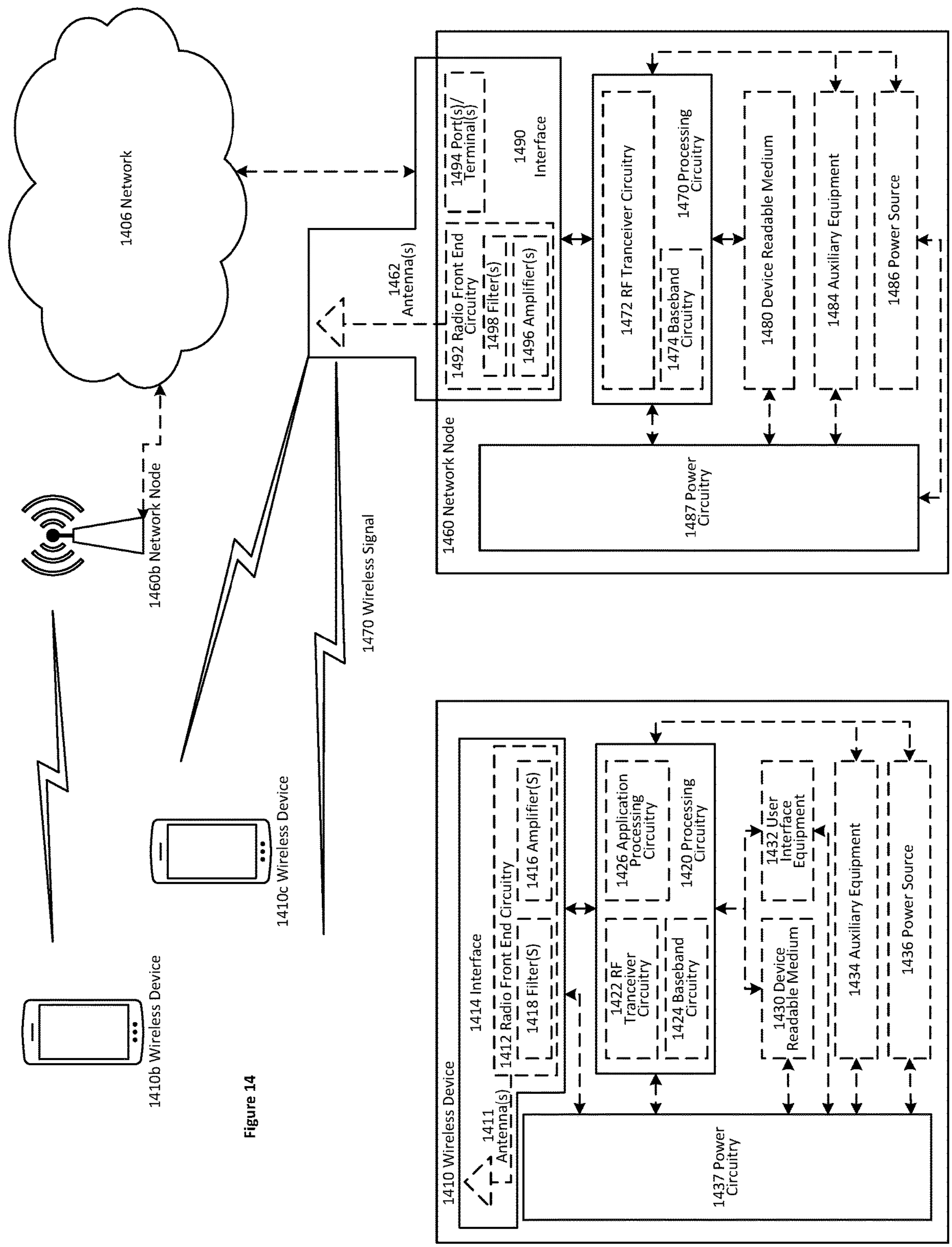
FIG. 14 illustrates an exemplary wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WDs 1410, 1410*b*, and 1410*c*. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470.

In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
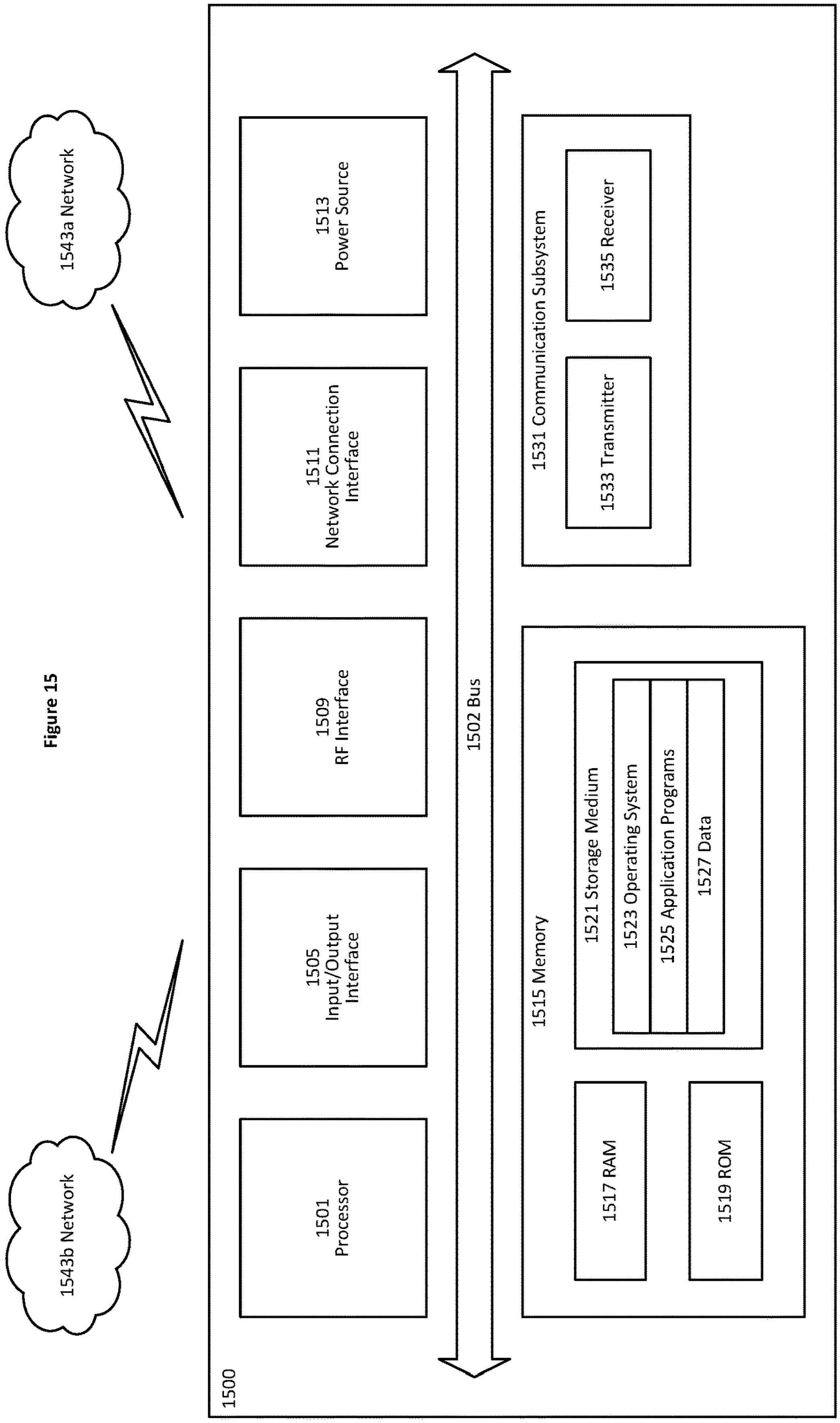
FIG. 15 illustrates an exemplary User Equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the 3rd Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543*a*. Network 1543*a* may encompass wired and/or wireless networks such as a local-area network (LAN), a wide-area network (WAN), a computer network, a wireless network, a telecommunications network, another like network or any combination thereof. For example, network 1543*a* may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543*b* using communication subsystem 1531. Network 1543*a* and network 1543*b* may be the same network or networks or different network or networks. Communication subsystem 1531 may be configured to include one or more transceivers used to communicate with network 1543*b*. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543*b* may encompass wired and/or wireless networks such as a local-area network (LAN), a wide-area network (WAN), a computer network, a wireless network, a telecommunications network, another like network or any combination thereof. For example, network 1543*b* may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
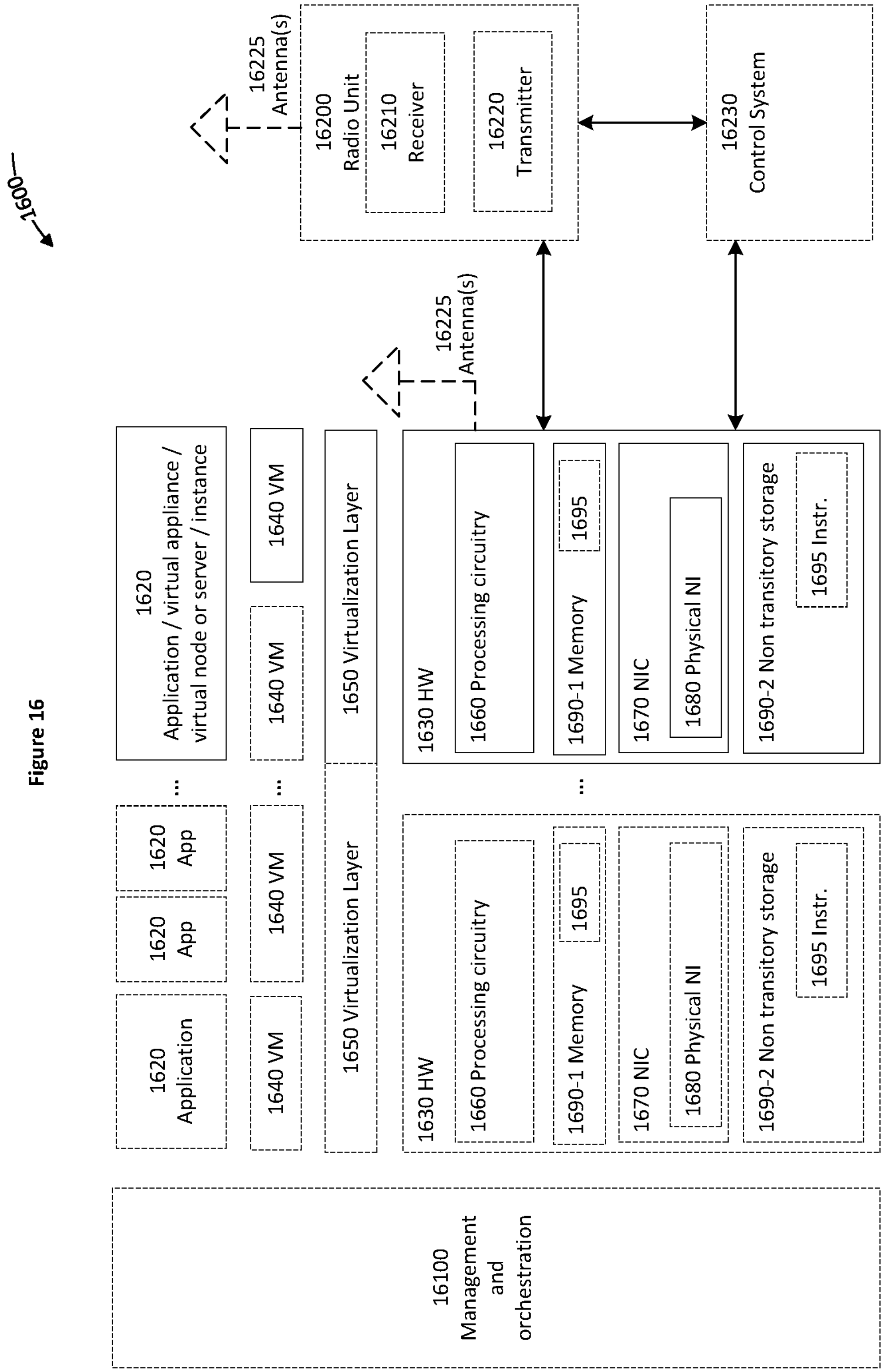
FIG. 16 illustrates an exemplary virtualization environment in accordance with some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
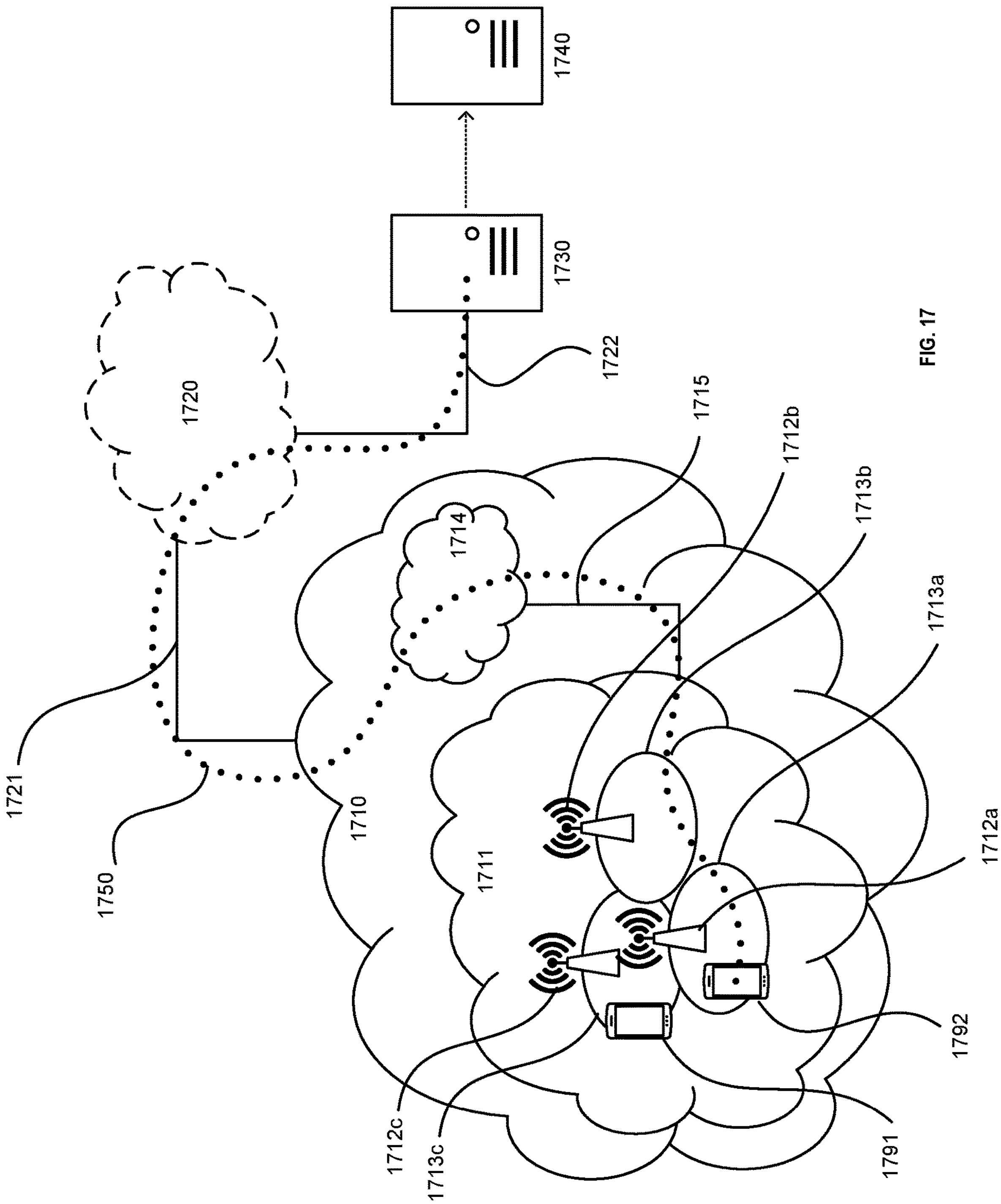
FIG. 17 illustrates an exemplary telecommunication network connected via an intermediate network to a host computer in accordance with some embodiments.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations **1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* is configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the corresponding base station 1712**.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer

1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown). Host computer 1730 can be connected to a database 1740. The connection between host computer 1730 and database 1740 can be a local connection (e.g., each is part of the same local network) or a remote connection (e.g., each is part of a different network). The connection between host computer 1730 and database 1740 can be via an intermediate network (e.g., 1720, a network satisfying the description above of 1720, or the like). In example implementations, database 1740 includes a server The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

Figure 18:
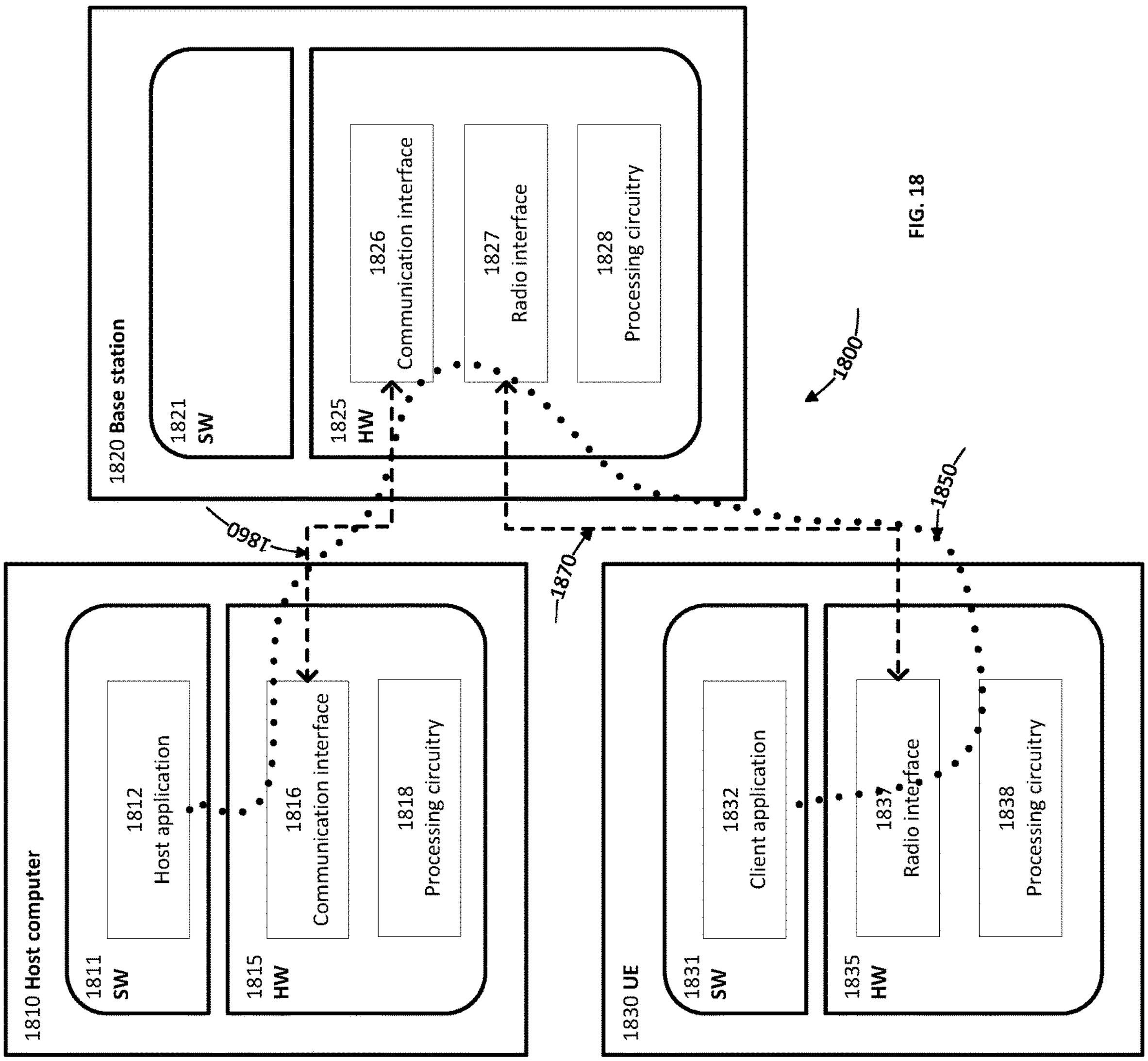
FIG. 18 illustrates an exemplary host computer communicating via an exemplary base station with an exemplary user equipment over a partially wireless connection in accordance with some embodiments.

It is noted that host computer 1810, base station 1820 and UE 1830 illustrated in FIG. 18 may be similar or identical to host computer 1730, one of base stations 1712*a*, 1712*b*, 1712*c* and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

What is claimed is:

1. A method performed by a network node, the method comprising:

receiving, from a device associated with a user profile, first data for a first data transaction that is assigned a unique identifier that uniquely identifies the first data transaction;

in response to receiving the first data from the device, enabling transmission of second data and the unique identifier to one or more data receiving entity, wherein the second data is associated with an indication of a time limit for retention of the first data for the first data transaction, and wherein the second data comprises data that includes the first data and data generated using the first data;

in accordance with a determination that the indication of the time limit indicates a non-zero time limit for retention of the first data for the first data transaction, enabling storage of one or more of the first data and the second data according to the time limit; and in accordance with a determination that the indication of the time limit does not indicate a non-zero time limit for retention of the first data for the first data transaction, causing deletion of the first data and the second data, wherein the first data qualifies as one or more classes of data, wherein when the first data qualifies as more than one class of data of the one or more classes of data, the first data is subject to a shortest data retention time limit for respective classes of data of the more than one class of data, and wherein the unique identifier includes one or more of the following:

a use code identifying at least one permitted use of the second data; and an entity identifier identifying at least one entity that is permitted to access the second data.

2. A method performed by an electronic device, the method comprising:

presenting one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits;

receiving user input, associated with the one or more options, that specifies a first data retention time limit for a first class of data, wherein the first data retention time limit is associated with a second data;

causing the first data retention time limit to be associated with the user profile that is associated with the electronic device; and while the first data retention time limit is associated with the user profile, transmitting one or more sets of data that qualify as the first class of data for storage at the remote user data collection system for no longer than the first data retention time limit, wherein the one or more sets of data that qualify as the first class of data are associated with one or more data transactions each identified by a respective unique identifier, wherein a first data qualifies as the one or more classes of data, wherein when the first data qualifies as more than one class of data of the one or more classes of data, the first data is subject to a shortest data retention time limit for respective classes of data of the more than one class of data, and wherein the respective unique identifier includes one or more of the following:

a use code identifying at least one permitted use of the second data; and an entity identifier identifying at least one entity that is permitted to access the second data.

3. A method performed by a network node, the method comprising:

receiving first data for a first data transaction that is associated with a user profile, wherein the first data includes:

a first unique identifier that uniquely identifies the first data transaction involving a device associated with the user profile;

an identifier of an external requesting entity, other than the user profile, that is permitted access to the first data;

an indication of a first time limit for retention of the first data for the first transaction; and first personal data, provided by a device associated with the user profile;

storing the first data for access by the external requesting entity;

providing, to the external requesting entity other than the user profile, the first unique identifier and the first personal data; and upon the expiration of the first time limit for retention of the first data for the first transaction, deleting at least a portion of the first data that includes the first unique identifier, wherein the first data qualifies as one or more classes of data, wherein when the first data qualifies as more than one class of data of the one or more classes of data, the first data is subject to a shortest data retention time limit for respective classes of data of the more than one class of data, and wherein the first unique identifier includes one or more of the following:

a use code identifying at least one permitted use of the second data; and an entity identifier identifying at least one entity that is permitted to access the second data.

4. A network node comprising one or more processor and memory including instructions executable by said one or more processor for causing the network node to:

receive, from a device associated with a user profile, first data for a first data transaction that is assigned a unique identifier that uniquely identifies the first data transaction;

in response to receiving the first data from the device, enable transmission of second data and the unique identifier to one or more data receiving entity, wherein the second data is associated with an indication of a time limit for retention of the first data for the first data transaction, and wherein the second data comprises data that includes the first data and data generated using the first data;

in accordance with a determination that the indication of the time limit indicates a non-zero time limit for retention of the first data for the first data transaction, enable storage of one or more of the first data and the second data according to the time limit; and in accordance with a determination that the indication of the time limit does not indicate a non-zero time limit for retention of the first data for the first data transaction, cause deletion of the first data and the second data, wherein the first data qualifies as one or more classes of data, wherein when the first data qualifies as more than one class of data of the one or more classes of data, the first data is subject to a shortest data retention time limit for respective classes of data of the more than one class of data, and wherein the unique identifier includes one or more of the following:

a use code identifying at least one permitted use of the second data; and an entity identifier identifying at least one entity that is permitted to access the second data.

5. The network node of claim 4, wherein the unique identifier is assigned by the device or the network node.

6. The network node of claim 4, wherein the memory further includes instructions executable by the one or more processor for causing the network node to:

perform one or more processes on the first data to generate the second data.

7. The network node of claim 4, wherein the unique identifier maintains anonymity of the device and the user profile from the one or more data receiving entity that receives transmission of or access to the second data.

8. The network node of claim 4, wherein the unique identifier is a one-time use identifier such that a different unique identifier is used for a second data transaction involving the device associated with the user profile.

9. The network node of claim 4, wherein enabling storage of one or more of the first data and the second data according to the time limit comprises one or more of the following:

storing, by the network node, the second data in data storage according to the time limit; and transmitting, by the network node, the second data to one or more database nodes for storage according to the time limit.

10. The network node of claim 4, wherein the memory further includes instructions executable by the one or more processor for causing the network node to:

cause deletion of one or more of the first data and the second data before or upon expiration of the time limit.

11. The network node of claim 4, wherein the time limit is a first time limit, wherein the second data is a first type of data that is subject to the first time limit, wherein third data, received from the device or generated by the network node based on data received from the device, is a second type of data that is different than the first type of data, and wherein the third data is subject to a second time limit different than the first time limit for at least the reason that the third data is the second type of data.

12. The network node of claim 4, wherein the user profile includes one or more user-configured time limits that includes the time limit.

13. The network node of claim 12, wherein the one or more user-configured time limits are specified respectively per one or more of: an identity of the receiving entity, a type of use, or a type of data.

14. An electronic device comprising one or more processor and memory including instructions executable by said one or more processor for causing the electronic device to:

present one or more options for configuring one or more data retention time limits for one or more classes of data, wherein the one or more classes of data are associated with one or more data transactions involving a user profile that is associated with the electronic device, wherein each of the one or more data retention time limits controls a length of time that a remote user data collection system is permitted to retain certain data, of the one or more classes of data, associated with a respective data retention time limit of the one or more data retention time limits;

receive user input, associated with the one or more options, that specifies a first data retention time limit for a first class of data, wherein the first data retention time limit is associated with a second data;

cause the first data retention time limit to be associated with the user profile that is associated with the electronic device; and while the first data retention time limit is associated with the user profile, transmit one or more sets of data that qualify as the first class of data for storage at the remote user data collection system for no longer than the first data retention time limit, wherein the one or more sets of data that qualify as the first class of data are associated with one or more data transactions each identified by a respective unique identifier, wherein the first data qualifies as the one or more classes of data, wherein when the first data qualifies as more than one class of data of the one or more classes of data, the first data is subject to a shortest data retention time limit for respective classes of data of the more than one class of data, and wherein the respective unique identifier includes one or more of the following:

a use code identifying at least one permitted use of the second data; and an entity identifier identifying at least one entity that is permitted to access the second data.

15. The electronic device of claim 14, wherein the memory further includes instructions executable by the one or more processor for causing the electronic device to:

receive user input, associated with the one or more options, that specifies a second data retention time limit for a subset of the first class of data;

cause the second data retention time limit to be associated with the user profile that is associated with the electronic device; and while the second data retention time limit is associated with the user profile, transmit one or more sets of data that qualify as the subset of the first class of data for storage at the remote user data collection system for no longer than the first data retention time limit or the second data retention time limit.

16. The electronic device of claim 14, wherein the memory further includes instructions executable by the one or more processor for causing the electronic device to:

receive user input, associated with the one or more options, that specifies a third data retention time limit for a second class of data, wherein the third data retention time limit is different than the first data retention time limit, and wherein the second class of data is different than the first class of data;

cause the third data retention time limit to be associated with the user profile that is associated with the electronic device; and while the third data retention time limit is associated with the user profile, transmit one or more sets of data that qualify as the second class of data for storage at the remote user data collection system for no longer than the third data retention time limit, wherein the one or more sets of data that qualify as the second class of data are associated with one or more data transactions each identified by a respective unique identifier.

17. The electronic device of claim 14, wherein a given class of data is defined in terms of one or more of the following:

an identity of an origin device, of one or more electronic devices associated with the user profile, that is the source of the respective data;

a destination receiving entity that is to be provided access to the respective data;

a use type for the respective data; and a type of the respective data.

18. The electronic device of claim 17, wherein the use type for the respective data includes one or more of the following: advertising, billing, service optimization, and media.

19. The electronic device of claim 17, wherein the type of the respective data includes one or more of the following: fitness data, location data, and financial transaction data.

20. A network node comprising one or more processor and memory including instructions executable by said one or more processor for causing the network node to:

receive first data for a first data transaction that is associated with a user profile, wherein the first data includes:

a first unique identifier that uniquely identifies the first data transaction involving a device associated with the user profile;

an identifier of an external requesting entity, other than the user profile, that is permitted access to the first data;

an indication of a first time limit for retention of the first data for the first transaction; and first personal data, provided by a device associated with the user profile;

store the first data for access by the external requesting entity;

provide, to the external requesting entity other than the user profile, the first unique identifier and the first personal data; and upon the expiration of the first time limit for retention of the first data for the first transaction, delete at least a portion of the first data that includes the first unique identifier, wherein the first data qualifies as one or more classes of data, wherein when the first data qualifies as more than one class of data of the one or more classes of data, the first data is subject to a shortest data retention time limit for respective classes of data of the more than one class of data, and wherein the first unique identifier includes one or more of the following:

a use code identifying at least one permitted use of the second data; and an entity identifier identifying at least one entity that is permitted to access the second data.

21. The network node of claim 20, wherein the memory further includes instructions executable by the one or more processor for causing the network node to:

receive second data for a second data transaction that is associated with the user profile, wherein the second data includes:

a second unique identifier that uniquely identifies the second data transaction involving the device associated with the user profile;

the identifier of the external requesting entity, other than the user profile, that is permitted access to the second data;

an indication of a second time limit for retention of the second data for the second transaction; and second personal data, provided by the device associated with the user profile, wherein the first personal data is a first type of data and the second personal data is a second type of data different from the first type of data, wherein the first type of data is subject to the first time limit for retention and the second type of data is subject to the second time limit for retention, and wherein the second time limit is different than the first time limit;

store the second data for access by the external requesting entity;

provide, to the external requesting entity other than the user profile, the second unique identifier and the second personal data; and upon the expiration of the second time limit for retention of the second data for the second transaction, delete at least a portion of the second data that includes the second unique identifier.

22. The network node of claim 21, wherein the external requesting entity is a first external requesting entity, and wherein the memory further includes instructions executable by the one or more processor for causing the network node to:

receive third data for a third data transaction that is associated with the user profile, wherein the third data includes:

a third unique identifier that uniquely identifies the third data transaction involving a device associated with the user profile;

an identifier of a second external requesting entity, other than the user profile, that is permitted access to at least a portion of the third data, wherein the first external requesting entity is different than the second external requesting entity;

an indication of a third time limit for retention of the third data for the third transaction, wherein data access permission for the first external requesting entity is subject to the first time limit for retention and data access permission for the second external requesting entity is subject to the third time limit for retention, and wherein the third time limit is different than the first time limit; and third personal data, provided by a device associated with the user profile;

store the third data for access by the second external requesting entity;

provide, to the second external requesting entity other than the user profile, the third unique identifier and the third personal data; and upon the expiration of the third time limit for retention of the third data for the third transaction, delete at least a portion of the third data that includes the third unique identifier.

23. The network node of claim 20, wherein the memory further includes instructions executable by the one or more processor for causing the network node to:

prior to the expiration of the first time limit, receive a request, from the external requesting entity, to access data from the first data including at least the first unique identifier and the first personal data, wherein the first unique identifier and the first personal data is provided in response to receiving the request.

24. The network node of claim 23, wherein the first data includes a permitted use code, wherein the request includes a requested use code, and wherein the memory further includes instructions executable by the one or more processor for causing the network node to:

determine that the permitted use code matches the requested use code prior to providing the first unique identifier and the first personal data to the external requesting entity.

25. The network node of claim 20, wherein deleting the at least the portion of the first data includes deleting the first personal data.

26. The network node of claim 20, wherein the first unique identifier maintains anonymity of the device and the user profile from the external requesting entity.

* * * * *